(12) United States Patent
Yamamoto et al.

(10) Patent No.: US 12,421,589 B2
(45) Date of Patent: *Sep. 23, 2025

(54) GALVANIZED STEEL SHEET, ELECTRODEPOSITION-COATED STEEL SHEET, AUTOMOTIVE PART, METHOD OF PRODUCING ELECTRODEPOSITION-COATED STEEL SHEET, AND METHOD OF PRODUCING GALVANIZED STEEL SHEET

(71) Applicant: JFE STEEL CORPORATION, Tokyo (JP)

(72) Inventors: Shunsuke Yamamoto, Tokyo (JP); Katsutoshi Takashima, Tokyo (JP); Yusuke Okumura, Tokyo (JP); Tomomi Kanazawa, Tokyo (JP); Katsuya Hoshino, Tokyo (JP); Takashi Kawano, Tokyo (JP); Takako Yamashita, Tokyo (JP); Hiroshi Matsuda, Tokyo (JP); Yoichi Makimizu, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 136 days.

This patent is subject to a terminal disclaimer.

(21) Appl. No.: 18/250,979

(22) PCT Filed: Nov. 5, 2021

(86) PCT No.: PCT/JP2021/040874
§ 371 (c)(1),
(2) Date: Apr. 28, 2023

(87) PCT Pub. No.: WO2022/097736
PCT Pub. Date: May 12, 2022

(65) Prior Publication Data
US 2023/0374639 A1    Nov. 23, 2023

(30) Foreign Application Priority Data
Nov. 6, 2020 (JP) .................................. 2020-186208

(51) Int. Cl.
*C22C 38/00* (2006.01)
*C21D 8/02* (2006.01)
(Continued)

(52) U.S. Cl.
CPC .............. *C23C 2/40* (2013.01); *C21D 8/0236* (2013.01); *C21D 9/46* (2013.01); *C22C 38/001* (2013.01);
(Continued)

(58) Field of Classification Search
CPC ... C25D 2/50; C25D 3/30; C25D 5/48; C21D 8/0236
See application file for complete search history.

(56) References Cited

U.S. PATENT DOCUMENTS 5,326,648 A   7/1994 Kato et al.
5,447,802 A   9/1995 Tobiyama et al.
(Continued)

FOREIGN PATENT DOCUMENTS

EP    3913106 A1    11/2021
JP    H04214895 A    8/1992
(Continued)

OTHER PUBLICATIONS

Oct. 16, 2024, Office Action issued by the Korean Intellectual Property Office in the corresponding Korean Patent Application No. 10-2023-7016205 with English language concise statement of relevance.
(Continued)

*Primary Examiner* — Adam Krupicka
(74) *Attorney, Agent, or Firm* — KENJA IP LAW PC

(57) ABSTRACT

To provide a steel sheet with excellent resistance to cracking in resistance welding at a welded portion. Disclosed is a
(Continued)

galvanized steel sheet including: a Si-containing cold-rolled steel sheet containing Si in an amount of 0.1 mass % or more and 3.0 mass % or less; an Fe-based electroplating layer formed on at least one surface of the Si-containing cold-rolled steel sheet with a coating weight per surface of 5.0 g/m² or more; and a galvanized layer formed on the Fe-based electroplating layer, in which in an intensity profile measured by glow discharge optical emission spectrometry, $I_{Si,Fe}/I_{Si,bulk}$ is 0.50 or more, and an average value of C concentration in a region ranging from 10 μm to 20 μm from an interface between the galvanized layer and the Fe-based electroplating layer towards the Fe-based electroplating layer is 0.10 mass % or less.

12 Claims, 10 Drawing Sheets

(51) Int. Cl.
  *C21D 9/46* (2006.01)
  *C22C 38/02* (2006.01)
  *C22C 38/04* (2006.01)
  *C22C 38/06* (2006.01)
  *C23C 2/02* (2006.01)
  *C23C 2/06* (2006.01)
  *C23C 2/40* (2006.01)
  *C23C 22/73* (2006.01)
  *C23C 28/02* (2006.01)
  *C25D 3/20* (2006.01)
  *C25D 5/36* (2006.01)
  *C25D 5/50* (2006.01)
  *C25D 7/06* (2006.01)

(52) U.S. Cl.
  CPC ............ *C22C 38/002* (2013.01); *C22C 38/02* (2013.01); *C22C 38/04* (2013.01); *C22C 38/06* (2013.01); *C23C 2/02* (2013.01); *C23C 2/0224* (2022.08); *C23C 2/024* (2022.08); *C23C 2/06* (2013.01); *C23C 28/021* (2013.01); *C25D 3/20* (2013.01); *C25D 5/36* (2013.01); *C25D 5/50* (2013.01); *C25D 7/0614* (2013.01)

(56) References Cited

U.S. PATENT DOCUMENTS

| | | |
|---|---|---|
| 6,699,590 B2 | 3/2004 | Takeda et al. |
| 11,274,356 B2 | 3/2022 | Takeda et al. |
| 2014/0363697 A1 | 12/2014 | Kim et al. |
| 2022/0220598 A1 | 7/2022 | Köhler et al. |

FOREIGN PATENT DOCUMENTS

| | | |
|---|---|---|
| JP | H06128758 A | 5/1994 |
| JP | 2011214102 A | 10/2011 |
| JP | 2013087314 A | 5/2013 |
| JP | 2015504976 A | 2/2015 |
| JP | 6388099 B1 | 9/2018 |
| WO | 9320254 A1 | 10/1993 |
| WO | 2020148944 A1 | 7/2020 |

OTHER PUBLICATIONS

Apr. 24, 2024, the Extended European Search Report issued by the European Patent Office in the corresponding European Patent Application No. 21889288.3.

Dec. 14, 2021, International Search Report issued in the International Patent Application No. PCT/JP2021/040874.

Jan. 10, 2023, Notification of Reasons for Refusal issued by the Japan Patent Office in the corresponding Japanese Patent Application No. 2022-520151 with English language Concise Statement of Relevance.

May 16, 2025, Office Action issued by the China National Intellectual Property Administration in the corresponding Chinese Patent Application No. 202180074965.3 with English language search report.

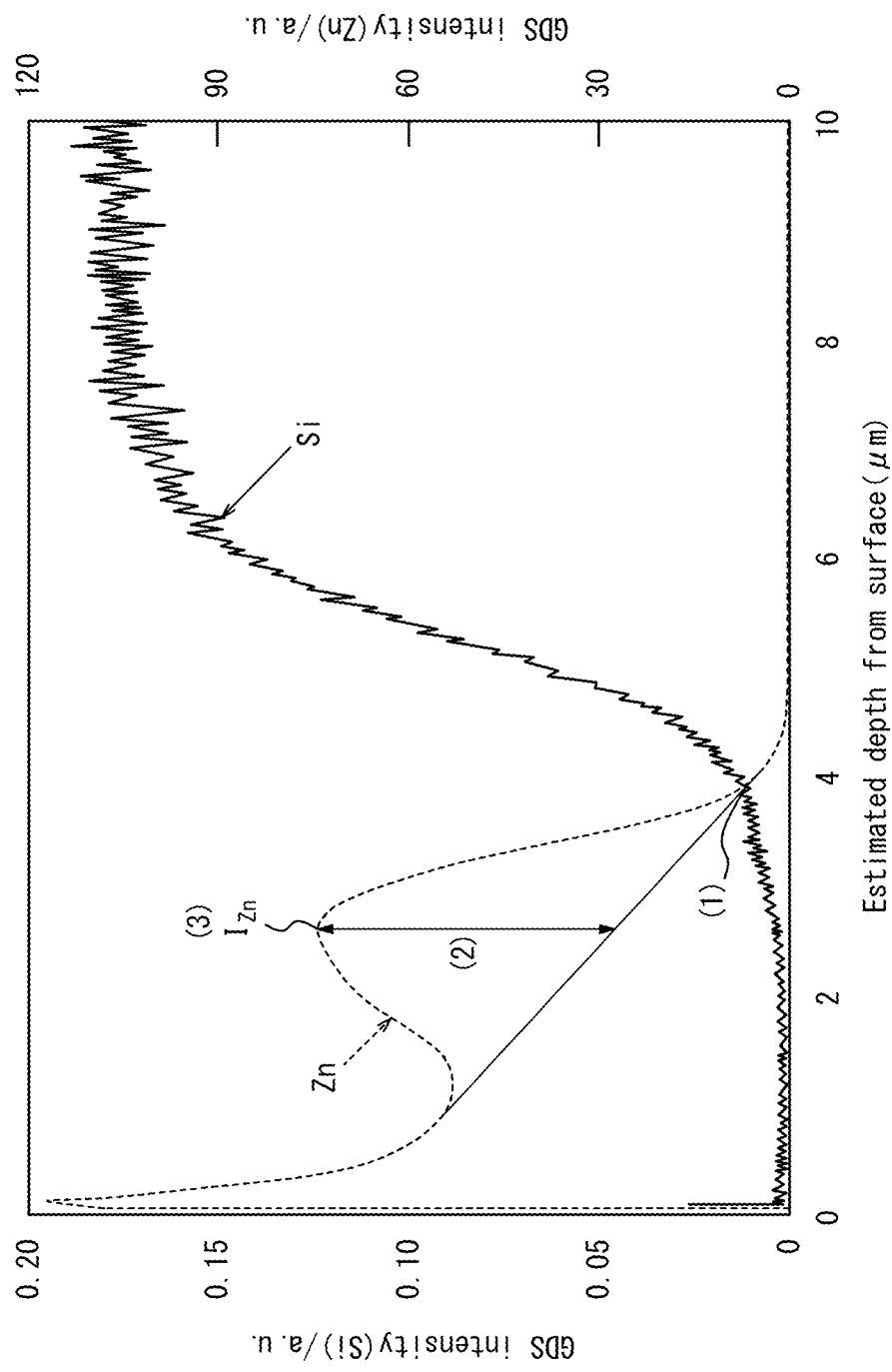

2 μm

GALVANIZED STEEL SHEET, ELECTRODEPOSITION-COATED STEEL SHEET, AUTOMOTIVE PART, METHOD OF PRODUCING ELECTRODEPOSITION-COATED STEEL SHEET, AND METHOD OF PRODUCING GALVANIZED STEEL SHEET

TECHNICAL FIELD

This disclosure relates to a galvanized steel sheet with excellent resistance to cracking in resistance welding, an electrodeposition-coated steel sheet, an automotive part, a method of producing an electrodeposition-coated steel sheet, and a method of producing a galvanized steel sheet.

BACKGROUND

In recent years, there has been a strong demand to improve the fuel efficiency of automobiles from the viewpoint of protecting the global environment. In addition, there has been a strong demand for improved automobile safety from the viewpoint of ensuring occupant safety in the event of a collision. In order to meet these demands, it is necessary to achieve lightweight and high-strength automotive bodies, and the use of high-strength steel sheets as the material for automotive parts is being actively promoted to achieve sheet metal thinning. However, since most automotive parts are manufactured by forming steel sheets, these steel sheets are required to have excellent formability in addition to high strength.

There are various methods to increase the strength of steel sheets. One method that can increase strength without significantly compromising the formability of steel sheets is solid solution strengthening by adding Si. On the other hand, in the manufacture of automotive parts, press-formed parts are often combined by resistance welding (spot welding). If the part to be subjected to resistance welding contains a high-strength galvanized steel sheet, there is concern that liquid metal embrittlement (LME) may occur during resistance welding when residual stresses are generated in the vicinity of a welded portion and the zinc in the coated or plated layer melts and diffuses into crystal grain boundaries, resulting in intergranular cracking (or LME cracking) in the steel sheet. In particular, if welding is performed with the welding electrode at an angle to the steel sheet, residual stresses may increase and cracks may form. Residual stresses are expected to increase with higher strength of the steel sheet, and thus there is concern about LME cracking associated with higher strength of the steel sheet. This problem of LME cracking is particularly pronounced in Si-containing steel sheets.

Therefore, there is a need for a high strength steel sheet with excellent resistance to cracking in resistance welding at a welded portion.

Conventionally, remedial measures for the above issues have been reported. JP 6388099 B (PTL 1) describes a hot-dip galvanized steel sheet having an internal oxidation layer in which the crystal grain boundaries are coated at least partially with oxides from the surface of the base metal to a depth of 5.0 μm or more, wherein the grain boundary coverage of the oxides is 60% or more in the region ranging from the surface of the base metal to a depth of 5.0 μm.

CITATION LIST

Patent Literature

PTL 1: JP 6388099 B

SUMMARY

Technical Problem

In the steel sheet described in PTL 1, the depth of the internal oxidation layer, or grain boundary oxidation, is too large, making it difficult to fully suppress cracking during resistance welding.

Thus, for galvanized steel sheets, no steel sheets have been developed that satisfy a high level of resistance to cracking in resistance welding at a welded portion.

In view of the above problems with galvanized steel sheets, it would thus be helpful to provide a steel sheet with excellent resistance to cracking in resistance welding at a welded portion.

Solution to Problem

Conventional techniques have attempted to improve the resistance to cracking in resistance welding only by means of surface layer control on the steel sheet side while forming an Fe-based electroplating layer as a protective layer for reducing the depth of grain boundary oxidation. However, the present inventors found it virtually impossible to satisfy a high level of resistance to cracking in resistance welding only by surface layer control on the steel sheet side. Then, the present inventors came up with the idea of controlling the properties of an Fe-based electroplating layer by heat treatment. In order to solve the above-mentioned problems, the present inventors made intensive studies and found the following. In order to satisfy a high level of resistance to cracking in resistance welding at a welded portion, it is important to: form, as a pre-plating before forming a galvanized layer, an Fe-based electroplating layer on a surface of a Si-containing cold-rolled steel sheet after subjection to cold rolling and before subjection to continuous annealing with a coating weight per surface of 5.0 g/m$^2$ or more to obtain a pre-annealing Fe-based electroplated steel sheet; subjecting the pre-annealing Fe-based electroplated steel sheet to a heating process with an average heating rate of 10° C./sec or higher in a temperature range from 400° C. to 650° C. and an annealing process in an atmosphere with a dew point above −30° C., to form internal oxides on crystal grain boundaries in the Fe-based electroplating layer; and adjust the number of crystal grain boundaries in the Fe-based electroplating layer that are in contact with the Si-containing cold-rolled steel sheet at an interface between the Fe-based electroplating layer and the Si-containing cold-rolled steel sheet to 10 or more per 10 μm in a sheet transverse direction of the Si-containing cold-rolled steel sheet. By forming the soft, Fe-based electroplating layer on the Si-containing cold-rolled steel sheet with a coating weight per surface of 5.0 g/m$^2$ or more, the stresses applied to the surface of the Si-containing cold-rolled steel sheet during welding are relieved, and by setting the average heating rate in the temperature range from 400° C. to 650° C. during the heating process to 10° C./sec or higher, the growth of crystal grains in the Fe-based electroplating layer is suppressed as much as possible during the heating process. In addition, by setting the dew point of the atmosphere in the subsequent annealing process above −30° C., Si that diffuses from the cold-rolled steel sheet to the Fe-based electroplating layer during annealing is caused to form an oxide inside the Fe-based electroplating layer and acts as a layer deficient in solute Si to suppress deterioration in toughness due to solid dissolution of Si, and the number of crystal grain boundaries in the Fe-based electroplating layer that are in contact with the interface between the Fe-based electroplating layer and the cold-rolled steel sheet is adjusted to 10 or more per 10 μm in the sheet transverse direction of the Si-containing cold-rolled steel sheet. In other words, the crystals in the Fe-based electroplating layer that are in contact with the interface between the cold-rolled steel sheet and the Fe-based electroplating layer are refined, resulting in dispersion of penetration paths of molten zinc into the Fe-based electroplating layer. The present inventors found that this may delay the time for the molten zinc to reach the crystal grain boundaries in the cold-rolled steel sheet during welding, thereby improving the resistance to cracking in resistance welding at a welded portion. In addition, in the annealing process, an average value of C concentration in a region ranging from 10 μm to 20 μm in the thickness direction from an interface between the galvanized layer and the Fe-based electroplating layer towards the Fe-based electroplating layer is adjusted to 0.10 mass % or less. Thus, by setting the average value of C concentration in the region ranging from 10 μm to 20 μm in the thickness direction from the interface between the galvanized layer and the Fe-based electroplating layer towards the Fe-based electroplating layer to 0.10 mass % or less, the resistance to cracking in resistance welding can be further improved. The present inventors found that when an Fe-based electroplating layer is formed before annealing, the C concentration in the region ranging from 10 μm to 20 μm in the thickness direction from the interface between the galvanized layer and the Fe-based electroplating layer towards the Fe-based electroplating layer can be reduced more, and the effect of improving the resistance to cracking in resistance welding can be obtained more effectively. Based on this finding, the present inventors completed the present disclosure.

The present disclosure is based on the aforementioned discoveries. Specifically, primary features of the present disclosure are as follows.

[1] A galvanized steel sheet comprising: a Si-containing cold-rolled steel sheet containing Si in an amount of 0.1 mass % or more and 3.0 mass % or less; an Fe-based electroplating layer formed on at least one surface of the Si-containing cold-rolled steel sheet with a coating weight per surface of 5.0 g/m² or more; and a galvanized layer formed on the Fe-based electroplating layer, wherein in an intensity profile measured by glow discharge optical emission spectrometry, a value of $I_{Si,Fe}/I_{Si,bulk}$ is 0.50 or more, where $I_{Si,Fe}$ denotes an average Si intensity in a region ranging from an interface between the galvanized layer and the Fe-based electroplating layer to an interface between the Fe-based electroplating layer and the Si-containing cold-rolled steel sheet, and $I_{Si,bulk}$ denotes an average Si intensity in the Si-containing cold-rolled steel sheet, an average value of C concentration in a region ranging from 10 μm to 20 μm in the thickness direction from the interface between the galvanized layer and the Fe-based electroplating layer towards the Fe-based electroplating layer is 0.10 mass % or less, and the number of crystal grain boundaries in the Fe-based electroplating layer that are in contact with the Si-containing cold-rolled steel sheet at the interface between the Fe-based electroplating layer and the Si-containing cold-rolled steel sheet is 10 or more per 10 μm in a sheet transverse direction in an observation field of view of the Si-containing cold-rolled steel sheet.

[2] The galvanized steel sheet according to aspect [1], wherein the Si-containing cold-rolled steel sheet contains Si in an amount of 0.50 mass % or more and 3.0 mass % or less.

[3] The galvanized steel sheet according to aspect [1] or [2], comprising a decarburized layer extending from the interface between the galvanized layer and the Fe-based electroplating layer towards the Fe-based electroplating layer.

[4] The galvanized steel sheet according to aspect [3], wherein the decarburized layer has a thickness of 30 μm or more.

[5] The galvanized steel sheet according to aspect [3] or [4], wherein a coating weight (g/m²) per surface of the Fe-based electroplating layer, denoted by $C.W._{Fe1}$, and a thickness (μm) of the decarburized layer, denoted by $C_d$, satisfy the following formula (1):

$$1.6\times(C.W._{Fe1})+(C_d)\geq 77 \quad (1).$$

[6] The galvanized steel sheet according to any one of aspects [1] to [5], wherein the Si-containing cold-rolled steel sheet has a chemical composition containing (consisting of), in addition to Si, in mass %, C: 0.8% or less, Mn: 1.0% or more and 12.0% or less, P: 0.1% or less, S: 0.03% or less, N: 0.010% or less, and Al: 1.0% or less, with the balance being Fe and inevitable impurities.

[7] The galvanized steel sheet according to aspect [6], wherein the chemical composition further contains, in mass %, at least one element selected from the group consisting of B: 0.005% or less, Ti: 0.2% or less, Cr: 1.0% or less, Cu: 1.0% or less, Ni: 1.0% or less, Mo: 1.0% or less, Nb: 0.20% or less, V: 0.5% or less, Sb: 0.020% or less, Ta: 0.1% or less, W: 0.5% or less, Zr: 0.1% or less, Sn: 0.20% or less, Ca: 0.005% or less, Mg: 0.005% or less, and REM: 0.005% or less.

[8] The galvanized steel sheet according to any one of aspects [1] to [7], wherein the Fe-based electroplating layer has a chemical composition containing (consisting of) at least one element selected from the group consisting of B, C, P, N, O, Ni, Mn, Mo, Zn, W, Pb, Sn, Cr, V, and Co, in a total amount of 10 mass % or less, with the balance being Fe and inevitable impurities.

[9] An electrodeposition-coated steel sheet comprising: a chemical conversion layer formed on the galvanized steel sheet as recited in any one of aspects [1] to [8]; and an electrodeposition coating layer formed on the chemical conversion layer.

[10] An automotive part at least partially made from the electrodeposition-coated steel sheet as recited in aspect [9].

[11] A method of producing an electrodeposition-coated steel sheet, the method comprising: subjecting the galvanized steel sheet as recited in any one of aspects [1] to [8] to chemical conversion treatment to obtain a chemical-conversion-treated steel sheet with a chemical conversion layer formed thereon; and subjecting the chemical-conversion-treated steel sheet to electrodeposition coating treatment to obtain an electrodeposition-coated steel sheet with an electrodeposition coating layer formed on the chemical conversion layer.

[12] A method of producing a galvanized steel sheet, the method comprising: subjecting a cold-rolled steel sheet containing Si in an amount of 0.1 mass % or more and 3.0 mass % or less to Fe-based electroplating to obtain a pre-annealing Fe-based electroplated steel sheet with a pre-annealing Fe-based electroplating layer formed on at least one surface thereof with a coating weight per surface of 5.0 g/m² or more; then heating the pre-annealing Fe-based electroplated steel sheet with an average heating rate of 10° C./sec or higher in a temperature range from 400° C. to 650° C., and cooling the pre-annealing Fe-based electroplated steel sheet after being held in the temperature range in an atmosphere with a dew point above −30° C., to obtain an Fe-based electroplated steel sheet; and then subjecting the Fe-based electroplated steel sheet to galvanization to obtain a galvanized steel sheet.

[13] The method of producing a galvanized steel sheet according to aspect [12], wherein the cold-rolled steel sheet contains Si in an amount of 0.50 mass % or more and 3.0 mass % or less.

[14] The method of producing a galvanized steel sheet according to aspect [12] or [13], wherein a coating weight (g/m²) per surface of the pre-annealing Fe-based electroplating layer, denoted by $C.W._{Fe0}$, and the dew point, denoted by D.P., satisfy the following formula (2):

$$(C.W._{Fe0}) + (D.P.) \geq 0 \quad (2).$$

[15] The method of producing a galvanized steel sheet according to any one of aspects [12] to [14], wherein the Fe-based electroplating is performed in an Fe-based electroplating bath containing at least one element selected from the group consisting of B, C, P, N, O, Ni, Mn, Mo, Zn, W, Pb, Sn, Cr, V, and Co, so that the at least one element is contained in the pre-annealing Fe-based electroplating layer in a total amount of 10 mass % or less.

Advantageous Effect

According to the present disclosure, a galvanized steel sheet with excellent resistance to cracking in resistance welding at a welded portion can be provided.

BRIEF DESCRIPTION OF THE DRAWINGS

In the accompanying drawings:

FIG. 2C is a diagram used to explain how the peak intensity $I_{Zn}$ is defined;

DETAILED DESCRIPTION

The LME cracking described above can be broadly classified into cracking that occurs on the surface in contact with the electrode (hereinafter referred to as "surface cracking") and cracking that occurs near the corona bond between steel sheets (hereinafter referred to as "internal cracking"). It is known that surface cracking is likely to occur in resistance welding at high currents where spatter is generated, and surface cracking can be suppressed by keeping the current within an appropriate range where spatter is not generated. On the other hand, internal cracking occurs even when the current during resistance welding is kept within an appropriate range where spatter is not generated. Surface cracking is easily detected by visual inspection during the manufacturing process, whereas internal cracking is difficult to detect by visual inspection. For these reasons, internal cracking is a particularly significant issue among LME cracking. If resistance welding is performed with the welding electrode at an angle to the steel sheet, residual stresses may increase and internal cracks may form. Since residual stresses are expected to increase as the steel sheet has higher strength, there is concern about internal cracking associated with higher strength of the steel sheet. According to the present disclosure, among the resistance to cracking in resistance welding, the property of preventing such internal cracking can be improved.

The following describes embodiments of the present disclosure. In the following, the units for the content of each element in the chemical composition of the Si-containing cold-rolled steel sheet and the content of each element in the chemical composition of the coated or plated layer are all "mass %," and are simply expressed in "%" unless otherwise specified. As used herein, a numerical range expressed by using "to" means a range including numerical values described before and after "to", as the lower limit value and the upper limit value. As used herein, a steel sheet having "high strength" means that the steel sheet has a tensile strength TS of 590 MPa or higher when measured in accordance with JIS Z 2241 (2011).

Figure 1:
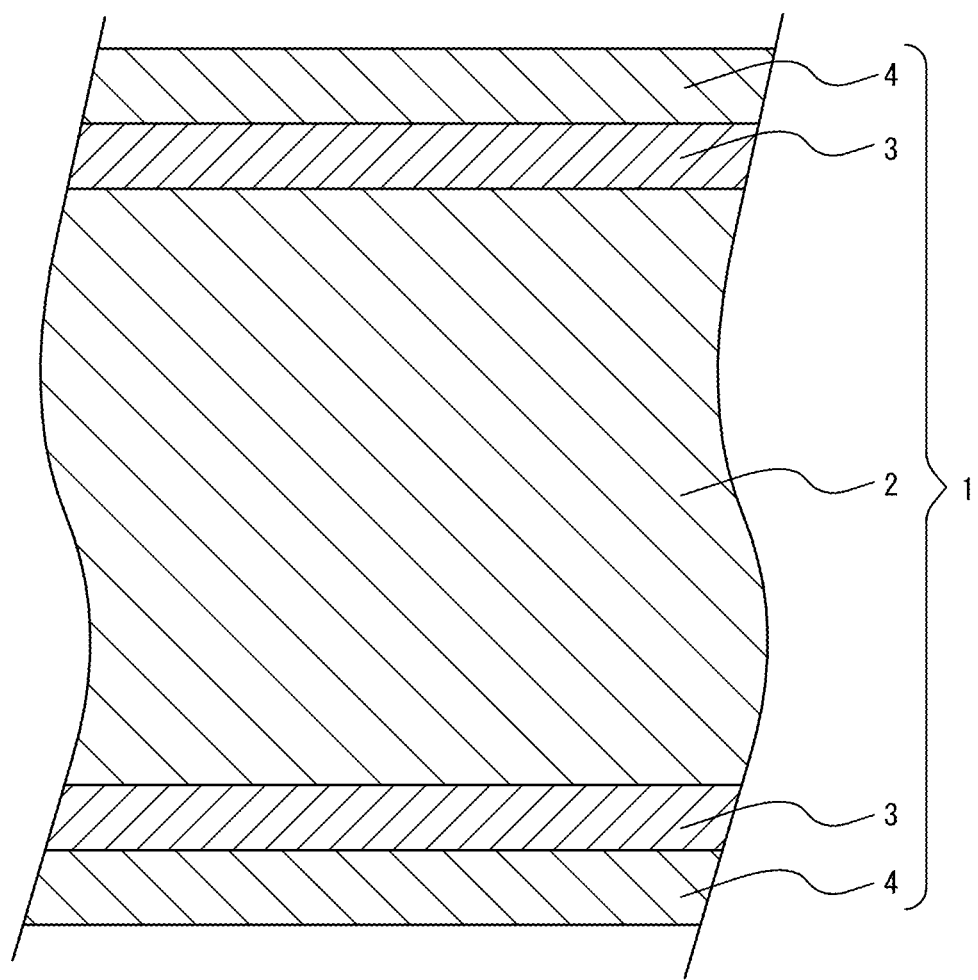
FIG. 1 schematically illustrates a cross-section of a galvanized steel sheet.

FIG. 1 schematically illustrates a cross-section of a galvanized steel sheet 1 according to this embodiment. As illustrated in FIG. 1, the galvanized steel sheet 1 has an Fe-based electroplating layer 3 on at least one surface of a Si-containing cold-rolled steel sheet 2 and a galvanized layer 4 formed on the Fe-based electroplating layer. First, the chemical composition of the Si-containing cold-rolled steel sheet will be explained.

Si: 0.1% or More and 3.0% or More

Si is an effective element for increasing the strength of a steel sheet because it has a large effect of increasing the strength of steel by solid dissolution (i.e., high solid solution strengthening capacity) without significantly impairing formability. On the other hand, Si is also an element that adversely affects the resistance to cracking in resistance welding at a welded portion. When Si is added to increase the strength of a steel sheet, the addition amount needs to be 0.1% or more. As long as Si is contained, internal oxides of Si can be formed at crystal grain boundaries in the Fe-based electroplating layer as described below. With a Si content less than 0.50%, conventional welding with a holding time of about 0.24 seconds is unlikely to cause particular problems with the resistance to cracking in resistance welding at a welded portion. However, the tact time during spot welding in the assembly process of automotive parts has become an issue from the viewpoint of production cost, and when measures are taken to reduce the holding time, the resistance to cracking in resistance welding at a welded portion may become insufficient even if the Si content is less than 0.50%. On the other hand, if the Si content exceeds 3.0%, hot rolling manufacturability and cold rolling manufacturability are greatly reduced, which may adversely affect productivity and reduce the ductility of the steel sheet itself. Therefore, Si should be added in the range of 0.1% to 3.0%. The Si content is preferably 0.50% or more, more preferably 0.7% or more, and more preferably 0.9% or more. The Si content is preferably 2.5% or less, more preferably 2.0% or less, and even more preferably 1.7% or less.

The Si-containing cold-rolled steel sheet in this embodiment is required to contain Si in the above range, yet may contain other components within a range allowable for ordinary cold-rolled steel sheets. The other components are not restricted in any particular way. However, if the Si-containing cold-rolled steel sheet in this embodiment is to be made to have high strength with a tensile strength (TS) of 590 MPa or higher, the following chemical composition is preferred.

C: 0.8% or Less (Exclusive of 0%)

C improves formability by forming, for example, martensite as a steel microstructure. When C is contained, the C content is preferably 0.8% or less, and more preferably 0.3% or less, from the perspective of good weldability. The lower limit of C is not particularly limited. However, to obtain good formability, the C content is preferably more than 0%, and more preferably 0.03% or more, and even more preferably 0.08% or more.

Mn: 1.0% or More and 12.0% or Less

Mn is an element that increases the strength of steel by solid solution strengthening, improves quench hardenability, and promotes the formation of retained austenite, bainite, and martensite. These effects are obtained by the addition of Mn in an amount of 1.0% or more. On the other hand, if the Mn content is 12.0% or less, these effects can be obtained without causing an increase in cost. Therefore, the Mn content is preferably 1.0% or more. The Mn content is preferably 12.0% or less. The Mn content is more preferably 1.3% or more, even more preferably 1.5% or more, and most preferably 1.8% or more. The Mn content is more preferably 3.5% or less, and even more preferably 3.3% or less.

P: 0.1% or Less (Exclusive of 0%)

Suppressing the P content can contribute to preventing deterioration of weldability. Suppressing the P content can also prevent P from segregating at grain boundaries, thus preventing degradation of ductility, bendability, and toughness. In addition, adding a large amount of P promotes ferrite transformation, causing an increase in the crystal grain size. Therefore, the P content is preferably 0.1% or less. The lower limit of the P content is not particularly limited, yet may be greater than 0% or 0.001% or more, in terms of production technology constraints.

S: 0.03% or Less (Exclusive of 0%)

The S content is preferably 0.03% or less, and more preferably 0.02% or less. Suppressing the S content can prevent deterioration of weldability as well as deterioration of ductility during hot working, suppress hot cracking, and significantly improve surface characteristics. Furthermore, suppressing the S content can prevent deterioration of ductility, bendability, and stretch flangeability of the steel sheet due to the formation of coarse sulfides as impurity elements. These problems become more pronounced when the S content exceeds 0.03%, and it is preferable to reduce the S content as much as possible. The lower limit of the S content is not particularly limited, yet may be greater than 0% or 0.0001% or more, in terms of production technology constraints.

N: 0.010% or Less (Exclusive of 0%)

The N content is preferably 0.010% or less. By setting the N content to 0.010% or less, it is possible to prevent the effect of the addition of Ti, Nb, and V in increasing the strength of the steel sheet from being lost as a result of N forming coarse nitrides with Ti, Nb, and V at high temperatures. Setting the N content to 0.010% or less can also prevent deterioration of toughness. Furthermore, setting the N content to 0.010% or less can prevent slab cracking and surface defects during hot rolling. The N content is preferably 0.005% or less, more preferably 0.003% or less, and even more preferably 0.002% or less. The lower limit of the N content is not particularly limited, yet may be greater than 0% or 0.0005% or more, in terms of production technology constraints.

Al: 1.0% or Less (Exclusive of 0%)

Since Al is thermodynamically most oxidizable, it oxidizes prior to Si and Mn, suppressing oxidation of Si and Mn at the topmost surface layer of the steel sheet and promoting oxidation of Si and Mn inside the steel sheet. This effect is obtained with an Al content of 0.01% or more. On the other hand, an Al content exceeding 1.0% increases the cost. Therefore, when added, the Al content is preferably 1.0% or less. The Al content is more preferably 0.1% or less. The lower limit of Al is not particularly limited, yet may be greater than 0% or 0.001% or more.

The chemical composition may optionally contain at least one element selected from the group consisting of B: 0.005% or less, Ti: 0.2% or less, Cr: 1.0% or less, Cu: 1.0% or less, Ni: 1.0% or less, Mo: 1.0% or less, Nb: 0.20% or less, V: 0.5% or less, Sb: 0.200% or less, Ta: 0.1% or less, W: 0.5% or less, Zr: 0.1% or less, Sn: 0.20% or less, Ca: 0.005% or less, Mg: 0.005% or less, and REM: 0.005% or less.

B: 0.005% or Less

B is an effective element in improving the quench hardenability of steel. To improve the quench hardenability, the B content is preferably 0.0003% or more, and more preferably 0.0005% or more. However, since excessive addition of B reduces formability, the B content is preferably 0.005% or less.

Ti: 0.2% or Less

Ti is effective for strengthening of steel by precipitation. The lower limit of Ti is not limited, yet is preferably 0.005% or more to obtain the strength adjustment effect. However, since excessive addition of Ti causes excessive hard phase and reduces formability, the Ti content, when added, is preferably 0.2% or less, and more preferably 0.05% or less.

Cr: 1.0% or Less

The Cr content is preferably 0.005% or more. Setting the Cr content to 0.005% or more improves the quench hardenability and the balance between strength and ductility. When added, the Cr content is preferably 1.0% or less from the viewpoint of preventing cost increase.

Cu: 1.0% or Less

The Cu content is preferably 0.005% or more. Setting the Cu content to 0.005% or more can promote formation of retained y phase. When added, the Cu content is preferably 1.0% or less from the viewpoint of preventing cost increase.

Ni: 1.0% or Less

The Ni content is preferably 0.005% or more. Setting the Ni content to 0.005% or more can promote formation of retained y phase. When added, the Ni content is preferably 1.0% or less from the viewpoint of preventing cost increase.

Mo: 1.0% or Less

The Mo content is preferably 0.005% or more. Setting the Mo content to 0.005% or more can yield a strength adjustment effect. The Mo content is more preferably 0.05% or more. When added, the Mo content is preferably 1.0% or less from the viewpoint of preventing cost increase.

Nb: 0.20% or Less

Setting the Nb content to 0.005% or more is effective in increasing strength. When added, the Nb content is preferably 0.20% or less from the viewpoint of preventing cost increase.

V: 0.5% or Less

Setting the V content to 0.005% or more is effective in increasing strength. When added, the V content is preferably 0.5% or less from the viewpoint of preventing cost increase.

Sb: 0.020% or Less

Sb can be contained from the viewpoint of suppressing oxidation on the steel sheet surface. Sb improves the wettability of plating by inhibiting oxidation of the steel sheet. To obtain this effect, the Sb content is preferably 0.001% or more. On the other hand, Sb inhibits the formation of decarburized layer. To obtain good resistance to cracking in resistance welding, the Sb content is preferably 0.02% or less. The Sb content is preferably 0.015% or less, and more preferably 0.012% or less.

Ta: 0.1% or Less

Setting the Ta content to 0.001% or more is effective in increasing strength. When added, the Ta content is preferably 0.1% or less from the viewpoint of preventing cost increase.

W: 0.5% or Less

Setting the W content to 0.005% or more is effective in increasing strength. When added, the W content is preferably 0.5% or less from the viewpoint of preventing cost increase.

Zr: 0.1% or Less

Setting the Zr content to 0.0005% or more is effective in increasing strength. When added, the Zr content is preferably 0.1% or less from the viewpoint of preventing cost increase.

Sn: 0.20% or Less

Sn is an effective element in suppressing, for example, denitrification and deboronization, thereby reducing the strength loss of steel. To obtain these effects, the content is preferably 0.002% or more. On the other hand, to obtain good impact resistance, the Sn content is preferably 0.20% or less.

Ca: 0.005% or Less

Setting the Ca content to 0.0005% or more makes it possible to control sulfide morphology and improve ductility and toughness. From the viewpoint of obtaining good ductility, the Ca content is preferably 0.005% or less.

Mg: 0.005% or Less

Setting the Mg content to 0.0005% or more makes it possible to control sulfide morphology and improve ductility and toughness. When added, the Mg content is preferably 0.005% or less from the viewpoint of preventing cost increase.

REM: 0.005% or Less

Setting the REM content to 0.0005% or more makes it possible to control sulfide morphology and improve ductility and toughness. When added, the REM content is preferably 0.005% or less from the viewpoint of obtaining good toughness.

In the Si-containing cold-rolled steel sheet according to this embodiment, the balance other than the above components is Fe and inevitable impurities.

Next, an Fe-based electroplating layer formed on at least one surface of the aforementioned Si-containing cold-rolled steel sheet will be described.

Fe-Based Electroplating Layer: 5.0 g/m$^2$ or More

It is considered that having an Fe-based electroplating layer with a coating weight per surface of 5.0 g/m$^2$ or more makes it possible to improve the resistance to cracking in resistance welding, especially internal cracking, at a welded portion, since the Fe-based electroplating layer functions as a soft layer to relax the stress given to the steel sheet surface during welding and can reduce the residual stress at a resistance-welded portion (hereinafter referred to as the "stress relaxation effect"). Furthermore, by setting the dew point above −30° C., Si that diffuses from the steel sheet into the Fe-based electroplating layer during annealing is caused to form an oxide inside the Fe-based electroplating layer, and the amount of solute Si is reduced. As a result, the steel sheet may have excellent resistance to cracking in resistance welding at a welded portion. Although the mechanism by which the resistance to cracking in resistance welding at a welded portion is improved by the Fe-based electroplating layer with a coating weight per surface of 5.0 g/m$^2$ or more is not clear, it is considered that a large amount of solute Si on the steel sheet surface degrades the toughness at the welded portion, resulting in deterioration of the resistance to cracking in resistance welding at the welded portion. In contrast, when a certain amount of an Fe-based electroplating layer is present on the steel sheet surface and controlled at a certain dew point, an oxide forms inside the Fe-based electroplating layer and acts as a layer deficient in solute Si, reducing the amount of solid dissolution of Si in the welded portion, which suppresses the decrease in toughness of the welded portion and improves resistance to cracking in resistance welding, especially internal cracking, at the welded portion (hereinafter referred to as the "toughness degradation suppression effect"). On the other hand, if a pre-annealing Fe-based electroplated steel sheet is annealed in an atmosphere with a low dew point of −30° C. or lower after the formation of the Fe-based electroplating layer, the crystal grains in the Fe-based electroplating layer may coarsen. Accordingly, molten zinc easily penetrates into the crystal grain boundaries in the Si-containing cold-rolled steel sheet via the crystal grain boundaries in the Fe-based electroplating layer. In this embodiment, the dew point of the atmosphere during annealing is controlled above −30° C. so that Si diffusing from the Si-containing cold-rolled steel sheet to the Fe-based electroplating layer during annealing is formed as internal oxides at grain boundaries in the Fe-based electroplating layer. The internal oxides of Si (hereinafter also referred to as "Si internal oxides") inhibit the growth of crystals in the Fe-based electroplating layer during the annealing process and make the crystals in the Fe-based electroplating layer finer. It is considered that the refinement of crystals causes more crystal grain boundaries to be formed in the Fe-based electroplating layer, resulting in dispersion of penetration paths of molten zinc during resistance welding, and delaying the time for the molten zinc to reach the crystal grain boundaries in the Si-containing cold-rolled steel sheet, thereby improving the resistance to cracking in resistance welding, especially internal cracking, at a welded portion (hereinafter referred to as the "effect of suppressing the intergranular penetration of zinc"). Although the mechanism by which the stress relaxation effect, the toughness degradation suppression effect, and the effect of suppressing the intergranular penetration of zinc obtained by the formation of the Fe-based electroplating layer contribute to the improvement of the resistance to cracking in resistance welding is complicated and not quantitatively clear, it is considered that these effects act in combination to improve the resistance to cracking in resistance welding. In order to obtain the effect of improving the resistance to cracking in resistance welding at a welded portion, the coating weight per surface of the Fe-based electroplating layer should be 5.0 g/m² or more. The upper limit of the coating weight per surface of the Fe-based electroplating layer is not particularly limited, yet is preferably 60 g/m² or less from the cost perspective. The coating weight of the Fe-based electroplating layer is preferably 50 g/m² or less, more preferably 40 g/m² or less, and even more preferably 30 g/m² or less. The Fe-based electroplated steel sheet preferably has Fe-based electroplating layers on both front and back surfaces of the Si-containing cold-rolled steel sheet. By setting the coating weight of the Fe-based electroplating layer to at least 5.0 g/m², or more than 5.0 g/m², particularly good resistance to cracking in resistance welding at a welded portion can be obtained. The coating weight per surface of the Fe-based electroplating layer may be 7.0 g/m² or more or 10.0 g/m² or more.

The thickness of the Fe-based electroplating layer is measured as follows. A sample of 10 mm×15 mm in size is taken from a galvanized steel sheet after subjection to galvanization and embedded in resin to make a cross-sectional embedded sample. Three arbitrary locations on the same cross-section are observed using a scanning electron microscope (SEM) at an accelerating voltage of 15 kV and a magnification of 2,000× to 10,000× depending on the thickness of the Fe-based electroplating layer. Then, the average thickness in the three fields of view is multiplied by the density of iron to convert the result of observation to the coating weight per surface of the Fe-based electroplating layer.

The Fe-based electroplating layer may be an Fe (pure Fe) plating layer, or an alloy plating layer such as the one formed from Fe—B alloy, Fe—C alloy, Fe—P alloy, Fe—N alloy, Fe—O alloy, Fe—Ni alloy, Fe—Mn alloy, Fe—Mo alloy, Fe—W alloy, or other alloy. Although the chemical composition of the Fe-based electroplating layer is not particularly limited, it is preferable that the chemical composition contain at least one element selected from the group consisting of B, C, P, N, O, Ni, Mn, Mo, Zn, W, Pb, Sn, Cr, V, and Co, in a total amount of 10 mass % or less, with the balance being Fe and inevitable impurities. Setting the total amount of elements other than Fe to 10 mass % or less can prevent a decrease in electrolytic efficiency, making it possible to form an Fe-based electroplating layer at low cost. In the case of Fe—C alloy, the C content is preferably 0.08 mass % or less.

The Fe-based electroplating layer has Si internal oxides at least in part of the crystal grain boundaries. The Si internal oxides inhibit the growth of crystals in the Fe-based electroplating layer during the annealing process and make the crystals in the Fe-based electroplating layer finer. This is considered to cause many crystal grain boundaries to be formed in the Fe-based electroplating layer, resulting in dispersion of penetration paths of molten zinc, delaying the time for the molten zinc to reach the crystal grain boundaries in the Si-containing cold-rolled steel sheet during resistance welding, and improving the resistance to cracking in resistance welding, especially internal cracking, at a welded portion.

The presence or absence of Si internal oxides in the Fe-based electroplating layer is determined by determining whether a ratio of $I_{Si,Fe}/I_{Si,bulk}$ is 0.50 or more, where $I_{Si,Fe}$ denotes an average Si intensity in a region ranging from an interface between the galvanized layer and the Fe-based electroplating layer to an interface between the Fe-based electroplating layer and the Si-containing cold-rolled steel sheet, and $I_{Si,bulk}$ denotes an average Si intensity in a region ranging from an interface between the Fe-based electroplating layer and the Si-containing cold-rolled steel sheet to 20 μm±0.5 μm in a thickness direction towards the Si-containing cold-rolled steel sheet, when analyzing the emission intensity at the wavelengths indicating Si in the depth direction (thickness direction) from the surface of the Fe-based electroplating layer using glow discharge optical emission spectrometry (GD-OES). The measurement conditions are as follows: Ar gas pressure 600 Pa, high frequency output 35 W, measurement diameter 4 mmϕ, and sampling interval 0.1 second. Both average Si intensities are obtained by averaging all Si intensities sampled in the respective ranges. The sputtering rate is calculated by measuring the depth of spatter traces after analyzing a Si-containing cold-rolled steel sheet without Fe-based electroplating and galvanization by glow discharge optical emission spectrometry under the same conditions, and the values shown in the horizontal axis of the intensity profile at the wavelength indicating Si are converted to the depth values at the corresponding time. A non-contact surface profilometer (NewView 7300 available from Zygo) was used to measure the depth of the spatter traces. The spatter rate in the galvanized layer is different from that in the Fe-based electroplating layer and the Si-containing cold-rolled steel sheet. In other words, the horizontal axis of the intensity profile does not correspond exactly to the positions visible in cross-sectional observation because the criteria for depth conversion are different due to elemental differences. In addition, it is generally known that measurement by glow discharge optical emission spectrometry results in a broad profile at interfaces formed from two or more materials due to unevenness, non-uniformity of sputtering, and other reasons. Therefore, Zn intensities are adopted here, and an intensity that is ½ of the peak intensity $I_{Zn}$ is defined as an interface between the galvanized layer and the Fe-based electroplating layer. FIG. 2C is used to explain how the peak intensity $I_{Zn}$ is defined. (1) First, a tangent line with two points of contact in the Zn intensity profile is found and drawn. (2) Then, at each estimated depth, the Zn intensity equal on the tangent line is subtracted from the Zn intensity in the Zn intensity profile. (3) Then, one of the Zn intensities in the Zn intensity profile that corresponds to the estimated depth at which the result of subtraction is largest is defined as $I_{Zn}$. $I_{Zn}$ is divided by 2. Then, the depth in the thickness direction at which the Zn intensity first reaches the value of $I_{Zn}/2$ when viewed from the Si-containing cold-rolled steel sheet side is defined as the depth of the interface between the galvanized layer and the Fe-based electroplating layer. Then, an average Si intensity ($I_{Si,Fe}$) in the region ranging from the interface between the galvanized layer and the Fe-based electroplating layer to the interface between the Fe-based electroplating layer and the Si-containing cold-rolled steel sheet is calculated. The depth in the thickness direction from the interface between the Fe-based electroplating layer and the Si-containing cold-rolled steel sheet is measured by the cross-sectional observation described above.

Figure 2A:
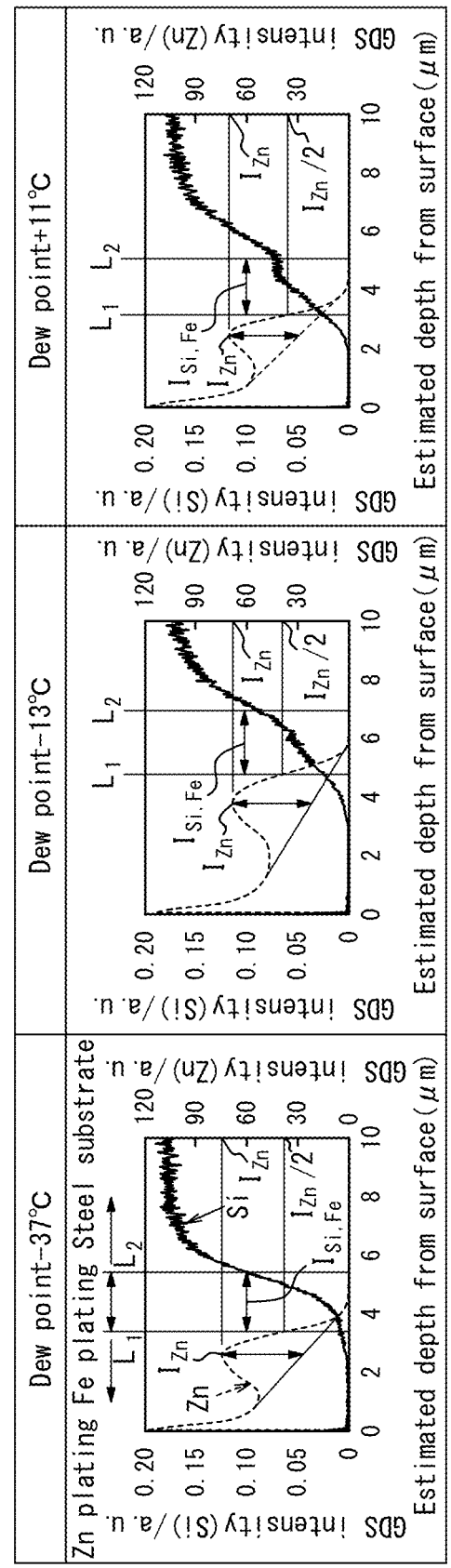
FIG. 2A illustrates an example of the raw data of an intensity profile analyzed for the emission intensity at wavelengths indicating Si and Zn using glow discharge optical emission spectrometry.
Figure 2B:
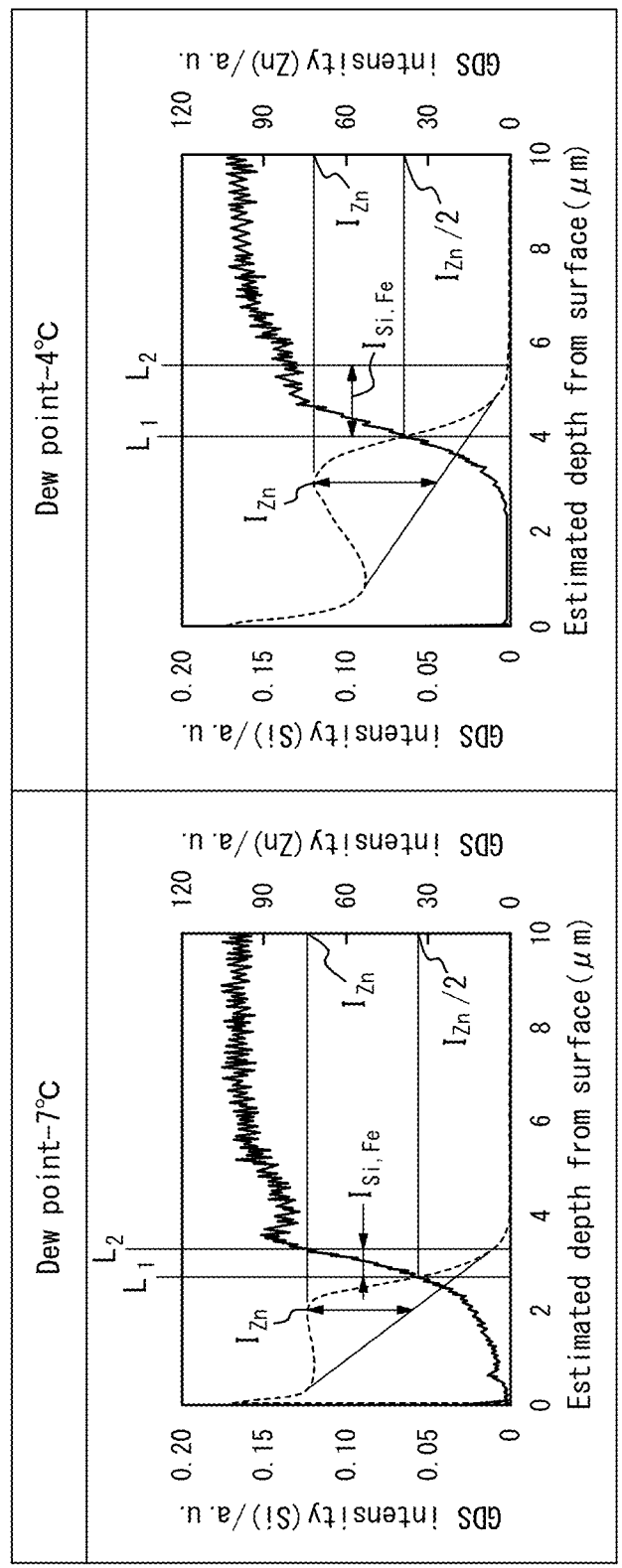
FIG. 2B illustrates an example of the raw data of an intensity profile analyzed for the emission intensity at wavelengths indicating Si and Zn using glow discharge optical emission spectrometry.

FIGS. 2A and 2B are used to illustrate representative cases analyzed for the emission intensity at wavelengths indicating Si and Zn observed in this embodiment. FIGS. 2A and 2B each illustrate the results obtained from the raw data of the intensity profiles analyzed for the emission intensity at wavelengths indicating Si and Zn for the galvanized steel sheets of Example No. 32 (in an annealing atmosphere with a dew point of −7° C.), Example No. 34 (with a dew point of −4° C.), Example No. 36 (in an annealing atmosphere with a dew point of −37° C.), Example No. 37 (with a dew point of −13° C.), and Example No. 39 (with a dew point of +11° C.) described below. In each intensity profile, the solid line represents emission intensities at wavelengths indicating Si, and the dashed line represents emission intensities at wavelengths indicating Zn. The depths from the interface between the galvanized layer and the Fe-based electroplating layer and from the interface between the Fe-based electroplating layer and the Si-containing cold-rolled steel sheet in these examples are labeled as $L_1$ and $L_2$, respectively. In Example No. 36, where the annealing process was performed in an atmosphere with a low dew point, the value of $I_{Si,Fe}/I_{Si,bulk}$ was 0.42. In contrast, in Examples 32, 34, 37, and 39, where the annealing process was performed in an atmosphere with a dew point above −30° C., the values of $I_{Si,Fe}/I_{Si,bulk}$ were 0.97, 0.86, 0.61, and 0.65, respectively. The fact that the value of $I_{Si,Fe}/I_{Si,bulk}$ is 0.50 or more means that internal oxidation occurs in, and thus Si internal oxides are present in the Fe-based electroplating layer. In this case, the thickness of the Fe-based electroplating layer is the value measured by the cross-sectional observation described above. For steel sheets with Si internal oxides within the aforementioned depth range, the growth of crystal grains in the Fe-based electroplating layer is suppressed by the internal oxides. Accordingly, even if an annealing process is performed after the Fe-based electroplating, the crystal grains in the Fe-based electroplating layer can be prevented from becoming coarse. This causes many crystal grain boundaries to be formed in the Fe-based electroplating layer, resulting in dispersion of penetration paths of molten zinc, delaying the time for the molten zinc to reach the crystal grain boundaries in the Si-containing cold-rolled steel sheet during resistance welding, and providing excellent resistance to cracking in resistance welding.

The number of crystal grain boundaries in the Fe-based electroplating layer that are in contact with the Si-containing cold-rolled steel sheet at the interface between the Fe-based electroplating layer and the Si-containing cold-rolled steel sheet is 10 or more per 10 µm in a sheet transverse direction in an observation field of view of the Si-containing cold-rolled steel sheet. If the number of crystal grain boundaries in the Fe-based electroplating layer that are in contact with the Si-containing cold-rolled steel sheet at the interface between the Fe-based electroplating layer and the Si-containing cold-rolled steel sheet is 10 or more per 10 µm in the sheet transverse direction of the Si-containing cold-rolled steel sheet, the crystal grains in the Fe-based electroplating layer are sufficiently refined. The refinement of crystal grains is considered to cause many crystal grain boundaries to be formed in the Fe-based electroplating layer, resulting in dispersion of penetration of molten zinc, delaying the time for the molten zinc to reach the crystal grain boundaries in the Si-containing cold-rolled steel sheet during welding, and improving the resistance to cracking in resistance welding, especially internal cracking, at a welded portion. The number of crystal grain boundaries in the Fe-based electroplating layer that are in contact with the Si-containing cold-rolled steel sheet at the interface between the Fe-based electroplating layer and the Si-containing cold-rolled steel sheet may preferably be 16 or more per 10 µm in the sheet transverse direction in an observation field of view of the Si-containing cold-rolled steel sheet. More preferably, it may be 20 or more per 10 µm in the sheet transverse direction in an observation field of view of the Si-containing cold-rolled steel sheet.

Figure 3A:
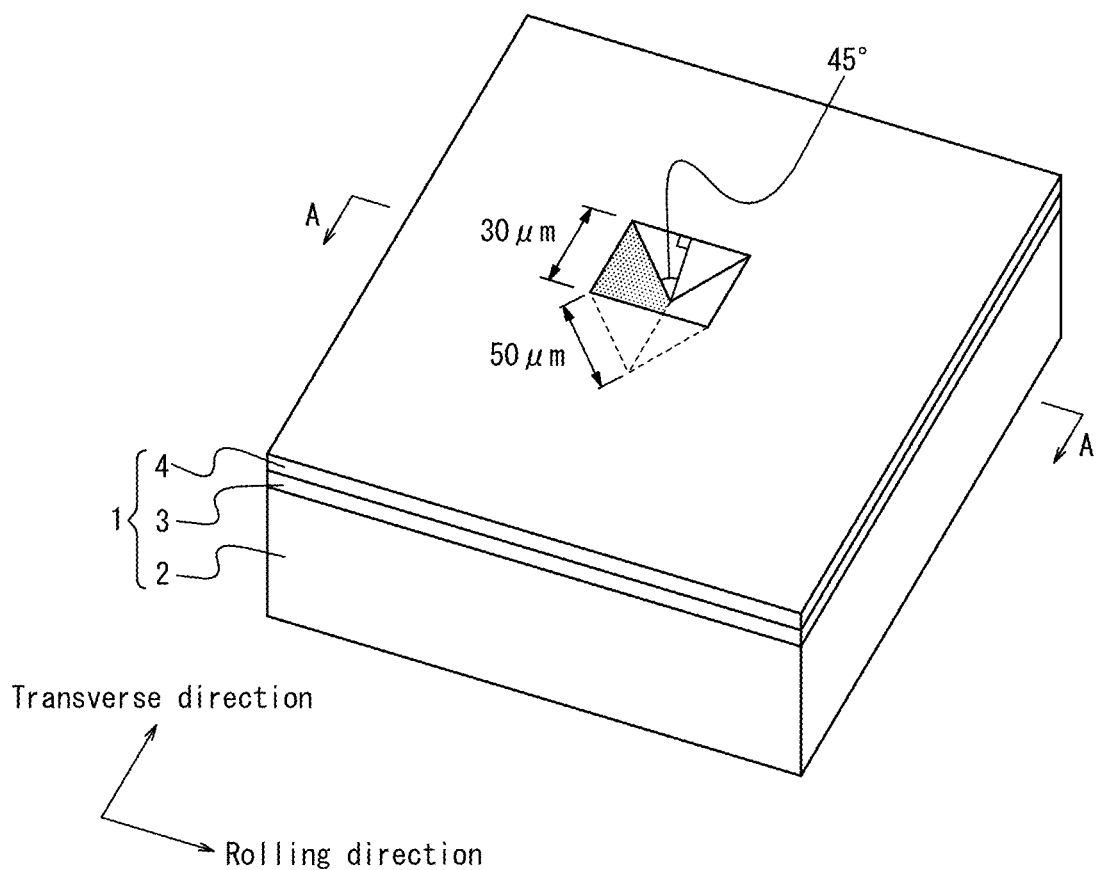
FIG. 3A is an oblique overview of a sample for observation to count the number of crystal grain boundaries in an Fe-based electroplating layer that are in contact with a Si-containing cold-rolled steel sheet at the interface between the Fe-based plating layer and the Si-containing cold-rolled steel sheet.
Figure 3B:
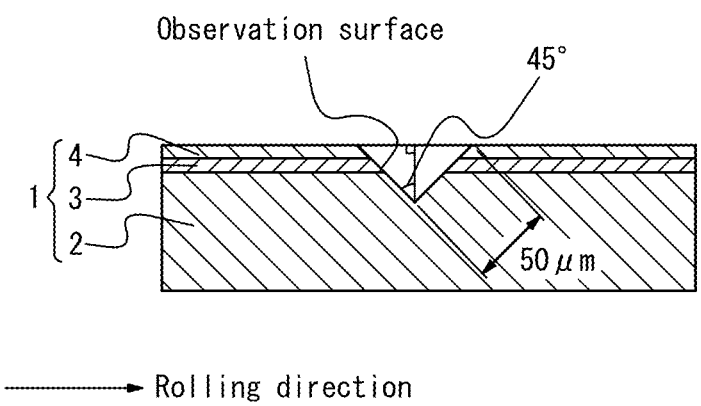
FIG. 3B is an A-A cross-sectional view of the sample for observation.
Figure 4:
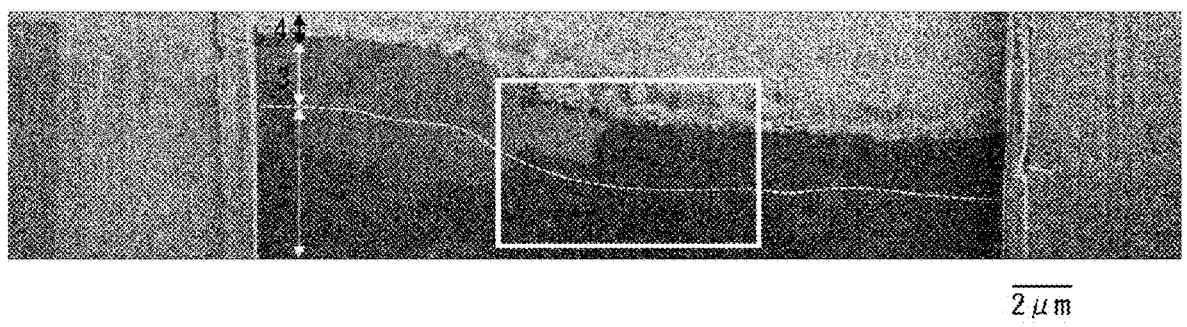
FIG. 4 illustrates a method of counting the number of crystal grain boundaries in the Fe-based electroplating layer that are in contact with the Si-containing cold-rolled steel sheet at the interface between the Fe-based plating layer and the Si-containing cold-rolled steel sheet.
Figure 5:
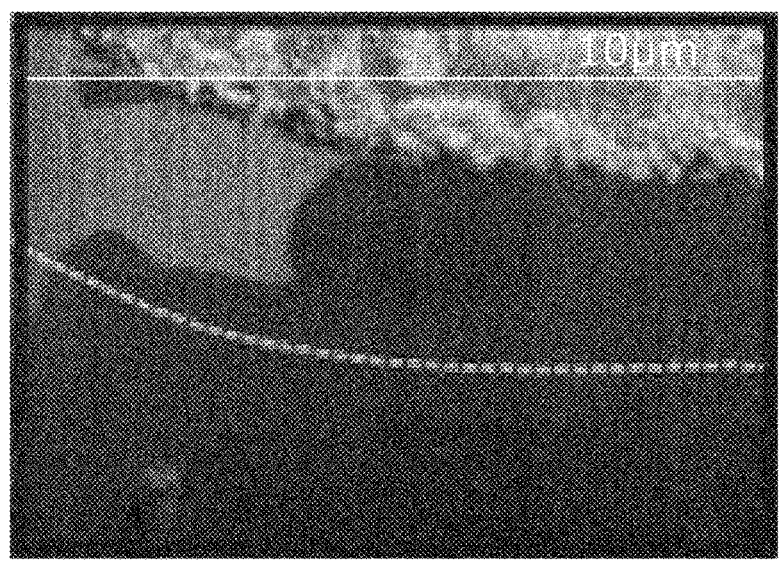
FIG. 5 is an enlarged view of the area enclosed by a square in FIG. 4.

In this case, the number of crystal grain boundaries in the Fe-based electroplating layer that are in contact with the Si-containing cold-rolled steel sheet at the interface between the Fe-based electroplating layer and the Si-containing cold-rolled steel sheet is measured as follows. First, a sample of 10 mm×10 mm in size is taken from a galvanized steel sheet. Any part of the sample is processed with a focused ion beam (FIB) device to form, at the processed part, a 45° cross-section at an angle of 45° relative to the direction of a T-section (i.e., a cross-section parallel to a transverse direction of the steel sheet (direction orthogonal to the rolling direction) and perpendicular to the steel sheet surface) with a width of 30 µm in the transverse direction and a length of 50 µm in a direction 45° relative to the T-section direction. The 45° cross-section thus formed is used as a sample for observation. FIGS. 3A and 3B schematically illustrate the sample for observation. FIG. 3A is an oblique view of the sample for observation. FIG. 3B is an A-A cross-section of the sample for observation illustrated in FIG. 3A. Then, using a scanning ion microscope (SIM), the center of the 45° cross-section of the sample for observation in the width and longitudinal directions of the sample is observed at a magnification of 5,000× to capture a SIM image. An example of such SIM image is illustrated in FIG. 4. FIG. 4 illustrates a SIM image of Example No. 36 described below, imaged as described above. From the SIM image, a region of 10 µm in the sheet transverse direction of the Si-containing cold-rolled steel sheet (enclosed by a square in FIG. 4) is extracted. For explanation, FIG. 5 illustrates an enlarged view of the area enclosed by the square in FIG. 4. As can be seen from FIG. 5, in the SIM image, a boundary line (dashed line in FIG. 5) is depicted at the interface between the Fe-based electroplating layer and the Si-containing cold-rolled steel sheet in the region of 10 µm in the sheet transverse direction of the Si-containing cold-rolled steel sheet. The number of crystal grain boundaries in the Fe-based electroplating layer on the boundary is counted, and the result is used as "the number of crystal grain boundaries in the Fe-based electroplating layer that are in contact with the Si-containing cold-rolled steel sheet at the interface between the Fe-based electroplating layer and the Si-containing cold-rolled steel sheet".

Figure 6:
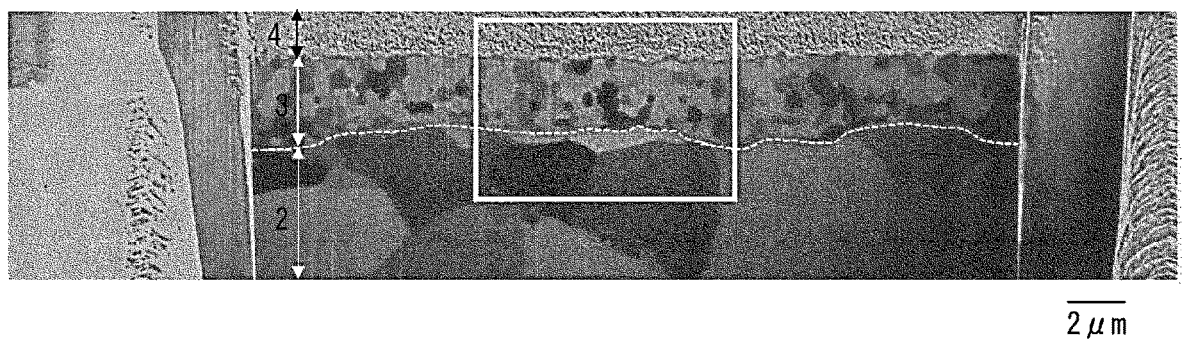
FIG. 6 illustrates an image for observing the interface between the Fe-based electroplating layer and the cold-rolled steel sheet in Example No. 37.
Figure 7:
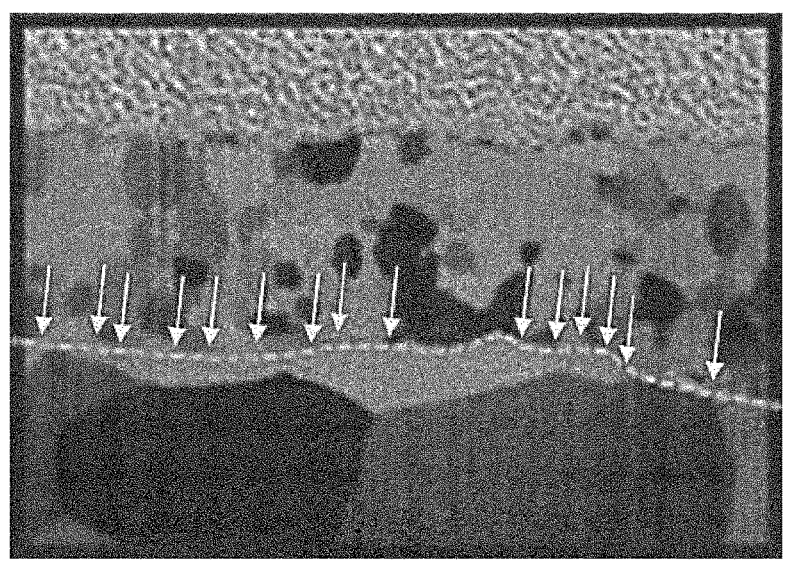
FIG. 7 illustrates an image of the interface between the Fe-based electroplating layer and the Si-containing cold-rolled steel sheet in Example No. 37, where a boundary line and the locations of crystal grain boundaries on the interface are depicted.
Figure 8:
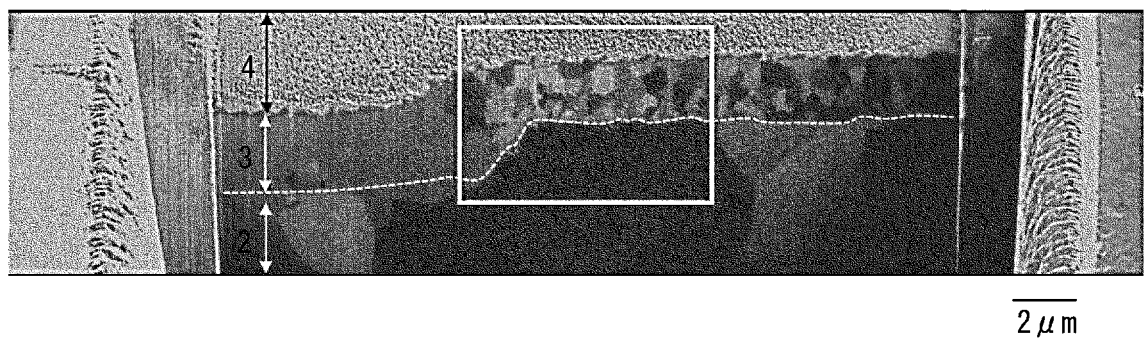
FIG. 8 illustrates an image for observing the interface between the Fe-based electroplating layer and the Si-containing cold-rolled steel sheet in Example No. 39.
Figure 9:
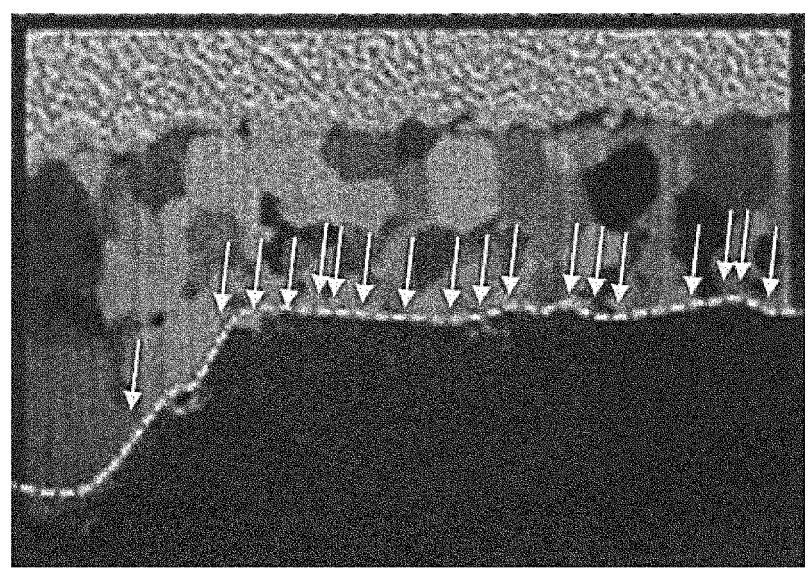
FIG. 9 illustrates an image of the interface between the Fe-based electroplating layer and the cold-rolled steel sheet in Example No. 39, where a boundary line and the locations of crystal grain boundaries on the interface are depicted.

FIG. 6 illustrates a SIM image of the interface between the Fe-based electroplating layer and the Si-containing cold-rolled steel sheet for Example No. 37 described below. FIG. 7 illustrates an image in which a boundary line and a measurement boundary line are depicted as described above in the center of the SIM image. In Example No. 37, crystal grain boundaries on the measurement boundary line were present at 15 locations indicated by the arrows per 10 μm in the sheet transverse direction of the Si-containing cold-rolled steel sheet. Therefore, in Example No. 37, the number of crystal grain boundaries in the Fe-based electroplating layer that were in contact with the Si-containing cold-rolled steel sheet at the interface between the Fe-based electroplating layer and the Si-containing cold-rolled steel sheet was per 10 μm in the sheet transverse direction of the Si-containing cold-rolled steel sheet. In addition, FIG. 8 illustrates a SIM image of the interface between the Fe-based electroplating layer and the Si-containing cold-rolled steel sheet for Example No. 39 described below. FIG. 9 illustrates an image in which a boundary line and a measurement boundary line are depicted as described above in the center of the SIM image. In Example No. 39, crystal grain boundaries on the measurement boundary line were present at 18 locations indicated by the arrows per 10 μm in the sheet transverse direction of the Si-containing cold-rolled steel sheet. Therefore, in Example No. 39, the number of crystal grain boundaries in the Fe-based electroplating layer that were in contact with the Si-containing cold-rolled steel sheet at the interface between the Fe-based electroplating layer and the Si-containing cold-rolled steel sheet was 18 per 10 μm in the sheet transverse direction of the Si-containing cold-rolled steel sheet.

The thickness of the galvanized steel sheet is not particularly limited, yet may usually be 0.5 mm or more and 3.2 mm or less.

Next, the C concentration of the surface layer of the Fe-based electroplating layer will be described. In this embodiment, it is important to adjust, through the aforementioned annealing, the average value of C concentration in the region ranging from 10 μm to 20 μm in the thickness direction from the interface between the galvanized layer and the Fe-based electroplating layer towards the Fe-based electroplating layer to be 0.10 mass % or less, and preferably 0.07 mass % or less. More preferably, during the annealing, a decarburized layer extending from an interface between the galvanized layer and the Fe-based electroplating layer towards the Fe-based electroplating layer is formed. In other words, during the annealing, a decarburized layer is formed in the surface layer of the galvanized steel sheet excluding the galvanized layer. In this case, a decarburized layer is a region near the interface between the galvanized layer and the Fe-based electroplating layer (i.e., the surface of the galvanized steel sheet excluding the galvanized layer) where the C concentration is lower than the concentration in the steel, and can be formed due to desorption of C from the surface of the Fe-based electroplated steel sheet during the annealing. If the average value of C concentration in the region ranging from 10 μm to 20 μm in the thickness direction from the interface between the galvanized layer and the Fe-based electroplating layer towards the Fe-based electroplating layer is 0.10 mass % or less, the region ranging from 10 μm to 20 μm in the thickness direction from the interface between the galvanized layer and the Fe-based electroplating layer towards the Fe-based electroplating layer becomes soft. This reduces the stress applied by the welding electrode during resistance welding and improves the resistance to cracking in resistance welding.

In this embodiment, by performing annealing after the formation of the Fe-based electroplating layer, the average value of C concentration in the region ranging from 10 μm to 20 μm in the thickness direction from the interface between the galvanized layer and the Fe-based electroplating layer towards the Fe-based electroplating layer can be reduced more than when no Fe-based electroplating layer is formed. In the case of forming a decarburized layer extending from the interface between the galvanized layer and the Fe-based electroplating layer towards the Fe-based electroplating layer, the C concentration in the decarburized layer can be reduced more, even if the thickness of the decarburized layer formed is equivalent. Therefore, the resistance to cracking in resistance welding can be improved without degrading the mechanical properties of the steel sheet. In the case of electroplating with a single metallic element, for example, Ni, Co, or Sn, the solubility of C in these metallic elements is extremely low, and the effect of promoting decarburization cannot be obtained since C is not solidly soluble.

Although the reason why the formation of the Fe-based electroplating layer causes a reduction in the C concentration in the region ranging from 10 μm to 20 μm in the thickness direction from the interface between the galvanized layer and the Fe-based electroplating layer towards the Fe-based electroplating layer is not clear, the present inventors speculate as follows. This is considered to be because the Fe-based electroplating layer contains little C, which induces diffusion of C from the Si-containing cold-rolled steel sheet, and because there are many diffusion paths for C to desorb through the Fe-based electroplating layer to the outside due to the refinement of crystal grains in the Fe-based electroplating layer, as described above.

As a result of the softening achieved by reducing the C concentration in the region ranging from 10 μm to 20 μm in the thickness direction from the interface between the galvanized layer and the Fe-based electroplating layer towards the Fe-based electroplating layer, the C concentration in the region ranging from 10 μm to 20 μm in the thickness direction from the interface between the galvanized layer and the Fe-based electroplating layer towards the Fe-based electroplating layer saturates below a certain level. Therefore, there is a limit to the improvement of resistance to cracking in resistance welding by means of softening. In this embodiment, by lowering the C concentration in the region ranging from 10 μm to 20 μm in the thickness direction from the interface between the galvanized layer and the Fe-based electroplating layer towards the Fe-based electroplating layer, it is confirmed that the resistance to cracking in resistance welding is effectively improved even when the decarburized layer is thin, suggesting that not only softening but also other effects such as an increase in the melting point due to the reduced C concentration may be expressed.

In the case of forming a decarburized layer, the thickness of the decarburized layer is preferably 15 μm or more, more preferably 30 μm or more, from the interface between the galvanized layer and the Fe-based electroplating layer towards the Fe-based electroplating layer. Although the upper limit of the thickness of the decarburized layer is not particularly limited, in order to keep the tensile strength within a good range, the thickness of the decarburized layer is preferably 130 μm or less from the interface between the galvanized layer and the Fe-based electroplating layer towards the Fe-based electroplating layer. The thickness of the decarburized layer is defined as the thickness, measured from the interface between the galvanized layer and the Fe-based electroplating layer towards the Fe-based electroplating layer, of a region in the surface layer of the galvanized steel sheet excluding the galvanized layer where the C concentration is determined to be 80% or less of that in the steel when analyzing the C concentration from the interface between the galvanized layer and the Fe-based electroplating layer in the thickness direction.

The average value of C concentration in the region ranging from 10 μm to 20 μm in the thickness direction from the interface between the galvanized layer and the Fe-based electroplating layer towards the Fe-based electroplating layer and the thickness of the decarburized layer are measured by surface analysis or line analysis of the elemental distribution near the interface between the galvanized layer and the Fe-based electroplating layer, as described below, using an electron probe micro analyzer (EPMA) on a cross-sectioned sample. First, a resin-embedded steel sheet is polished and a vertical section in the rolling direction is finished for observation, and then the steel sheet is removed from the resin to be used as a sample for measurement. The accelerating voltage is 7 kV and the irradiation current is 50 nA. Surface analysis or line analysis is performed on a cross-section of the sample in 1 μm steps over a 300 μm×300 μm area including the interface between the galvanized layer and the Fe-based electroplating layer to measure the C intensity. In order to suppress contamination, hydrocarbons on and around the sample surface are removed by a plasma cleaner in the measurement room and sample preparation room before the start of measurement. To suppress the accumulation of hydrocarbons during the measurement, the measurement is performed while the sample is heated to and held at a maximum sample temperature of 100° C. on the stage. The sample temperature is preferably 90° C. or higher. The C intensity is converted to a C concentration (in mass %) using a calibration curve prepared by performing measurements on a standard sample separately. The next step is to confirm that the lower limit of C detection is sufficiently lower than 0.10 mass % due to the effect of contamination control. The details of the equipment used and the method of contamination control are described in Reference 1 below.

Reference 1: Yamashita et al., "*Distribution of Carbon in Low-Carbon Steel in the Early Phase of Proeutectoid Ferrite by High Precision FE-EPMA,*" Iron and Steel, Vol. 103 (2017) No. 11., pp. 14-20

However, the above configuration is not necessarily required because the necessity of contamination countermeasures during measurement depends on the machine model used and conditions. In other words, the measurement conditions are only required to confirm that sufficient accuracy has been obtained, and the measurement conditions are not intrinsically related to the effect of the present disclosure.

In the obtained concentration map, a line profile in the thickness direction is extracted from the interface between the galvanized layer and the Fe-based electroplating layer and averaged over 300 points in the direction parallel to the steel sheet surface to obtain a profile of C concentration at depths in the thickness direction. The obtained profile of C concentration at depths in the thickness direction is smoothed by a simple moving average method. In this case, the number of smoothing points is preferably about 21. If the number of smoothing points in the vicinity of the surface layer of the sample is less than 10 points on one surface, the surface is preferably smoothed for the available measurement points. The depth, measured in the thickness direction from the interface between the galvanized layer and the Fe-based electroplating layer, of the region where the C concentration is determined to be 80% or less of that in the steel in the intensity profile after smoothing is then evaluated to determine the thickness of the decarburized layer. The C concentration in the region ranging from 10 μm to 20 μm in the thickness direction from the interface between the galvanized layer and the Fe-based electroplating layer towards the Fe-based electroplating layer is determined by averaging the C concentration values at a total of 11 points at a pitch of 1 μm. The above evaluation is applied to the measurement results of two fields of view for each sample, and the average of the results is used as the average value of C concentration in the region ranging from 10 μm to 20 μm in the thickness direction from the interface between the galvanized layer and the Fe-based electroplating layer towards the Fe-based electroplating layer and the evaluation value of the thickness of the decarburized layer.

Figure 10A:
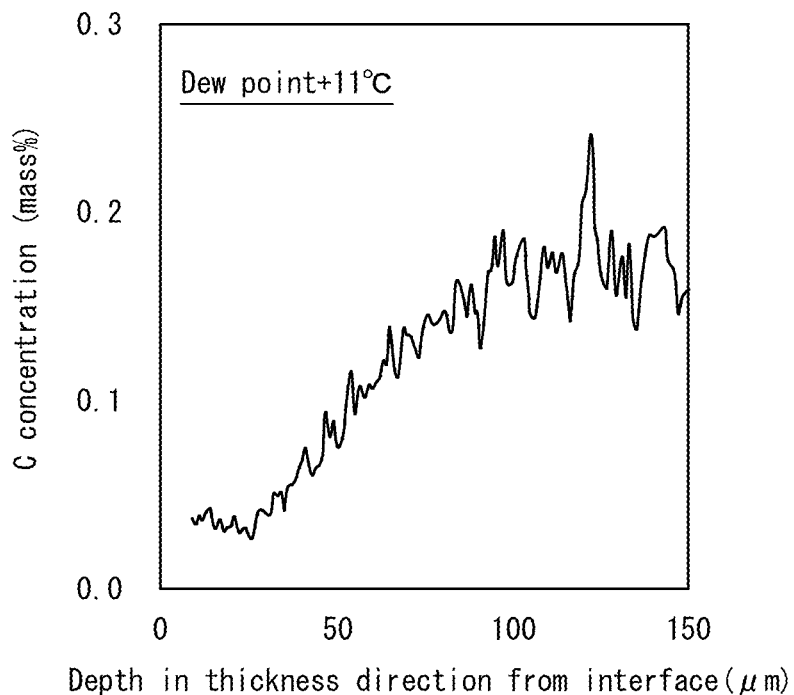
FIG. 10A illustrates an example of raw data of profiles of C concentration at depths in the thickness direction when analyzed by an electron beam microanalyzer.
Figure 10B:
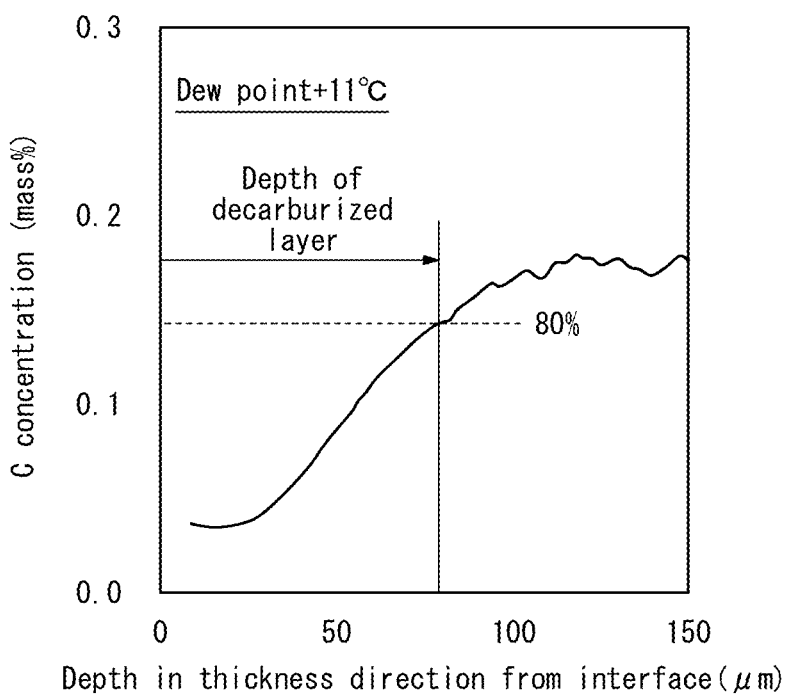
FIG. 10B illustrates an example of the data after smoothing of profiles of C concentration at depths in the thickness direction when analyzed by an electron beam microanalyzer.

FIGS. 10A and 10B are used to illustrate typical examples of profiles of C concentration at depths in the thickness direction when analyzed by EPMA. FIG. 10A illustrates the results obtained from the raw data of profiles of C concentration at depths in the thickness direction when analyzed for the galvanized steel sheet of Example No. 39 described below. The measurement was performed with the galvanized layer peeled off. FIG. 10B illustrates the raw data in FIG. 10A after smoothing by the simple moving average method with 21 smoothing points. As can be seen from FIG. 10B, in this example, there was a decarburized layer in which the C concentration was 80% or less of that in the steel, and the depth, measured in the thickness direction from the interface between the galvanized layer and the Fe-based electroplating layer, of the decarburized layer was 82 μm.

As mentioned above, the property of the Fe-based electroplating layer to prevent internal cracking is provided by the effect of reduction in the C concentration in the surface layer as a result of promotion of decarburization by the Fe-based electroplating layer, in combination with the effect of suppressing the intergranular penetration of zinc plating, the stress relaxation effect, and the toughness degradation suppression effect. Although the combined effect of these actions has not been quantitatively clarified, it is desirable that the coating weight (g/m$^2$) of the Fe-based electroplating layer after galvanization, denoted by C.W.$_{Fe1}$, and the thickness (μm) of the decarburized layer, denoted by C$_d$, satisfy the following formula (1):

$$1.6 \times (C.W._{Fe1}) + (C_d) \geq 77 \qquad (1).$$

This is because the resistance to cracking in resistance welding is particularly good if the coating weight (g/m$^2$) of the Fe-based electroplating layer after galvanization C.W.$_{Fe1}$ and the thickness (μm) of the decarburized layer C$_d$ satisfy the formula (1).

Next, the galvanized layer formed on the aforementioned Fe-based electroplating layer will be described. As used herein, the "galvanized layer" means a zinc layer formed on the surface of the steel sheet. The "galvanized layer" is not limited to a layer formed by plating, coating, thermal spraying, cold spraying, or other zinc layer formation methods, but includes any zinc layers that are formed on the surface of the steel sheet. While forming a galvanized layer on the steel sheet surface can provide excellent corrosion resistance, it is generally difficult to improve the resistance to cracking in resistance welding at a welded portion because zinc may melt and penetrate into crystal grain boundaries in the Si-containing cold-rolled steel sheet during resistance welding. As mentioned above, by forming an Fe-based electroplating layer on the surface of the cold-rolled steel sheet after subjection to the cold rolling and before subjection to the annealing process, as a pre-plating before the formation of the galvanized layer, with a coating weight of 5.0 g/m$^2$ or more per surface, it is possible to improve the resistance to cracking in resistance welding at a welded portion in the galvanized steel sheet. As mentioned above, by forming an Fe-based electroplating layer as a pre-plating prior to the formation of the galvanized layer, it is possible to improve the resistance to cracking in resistance welding at a welded portion of the galvanized steel sheet, regardless of the type of galvanized layer. The galvanized layer may be, for example, a hot-dip galvanized layer, an electroplating layer, a zinc-thermal-sprayed layer, or a cold-sprayed layer. The composition of the galvanized layer is not limited. However, in the case of the galvanized layer being a hot-dip galvanized layer, the galvanized layer is composed of, for example, Al, Zn, and inevitable impurities. The Al content in the galvanized layer is not specified. However, in one example, the Al content in the hot-dip galvanized layer is 0.05 mass % or more and 0.250 mass % or less. Note that the galvanized layer is not an galvannealed layer.

The coating weight per surface of the galvanized layer may be 25 g/m$^2$ or more and 80 g/m$^2$ or less. By setting the coating weight per surface of the galvanized layer to 25 g/m$^2$ or more, the corrosion resistance can be further improved and the coating weight can be easily controlled. By setting the coating weight per surface of the galvanized layer to 80 g/m$^2$ or less, good coating or plating adhesion is obtained. More preferably, the coating weight per surface of the galvanized layer may be 35 g/m$^2$ or more. More preferably, the coating weight per surface of the galvanized layer may be 60 g/m$^2$ or less.

According to the present disclosure, it is possible to provide a high-strength galvanized steel sheet with a tensile strength TS of 590 MPa or more when measured in accordance with JIS Z 2241 (2011). The strength of the galvanized steel sheet is more preferably 800 MPa or more.

<Method of Producing Galvanized Steel Sheet>

Next, a method of producing a galvanized steel sheet will be described. The method of producing a galvanized steel sheet according to an embodiment of the present disclosure may comprise:

subjecting a cold-rolled steel sheet containing Si in an amount of 0.1 mass % or more and 3.0 mass % or less to Fe-based electroplating to obtain a pre-annealing Fe-based electroplated steel sheet with a-pre-annealing Fe-based electroplating layer formed on at least one surface thereof with a coating weight per surface of 5.0 g/m$^2$ or more;

then heating the pre-annealing Fe-based electroplated steel sheet with an average heating rate of 10° C./sec or higher in a temperature range from 400° C. to 650° C., and cooling the pre-annealing Fe-based electroplated steel sheet after being held in the temperature range in an atmosphere with a dew point above −30° C., to obtain an Fe-based electroplated steel sheet; and then subjecting the Fe-based electroplated steel sheet to galvanization to obtain a galvanized steel sheet.

First, a cold-rolled steel sheet containing Si in an amount of 0.1 mass % or more and 3.0 mass % or less is produced. The cold-rolled steel sheet may contain Si in an amount of 0.50 mass % or more and 3.0 mass % or less. Regarding the method of producing a cold-rolled steel sheet, conventional methods may be followed. In one example, a cold-rolled steel sheet is produced by hot rolling a steel slab having the chemical composition described above to obtain a hot-rolled sheet, subjecting the hot-rolled sheet to acid cleaning, and then cold rolling the hot-rolled sheet to obtain a cold-rolled steel sheet.

Next, the surface of the cold-rolled steel sheet is subjected to Fe-based electroplating to obtain a pre-annealing Fe-based electroplated steel sheet. The Fe-based electroplating is not limited to a particular method. For example, a sulfuric acid bath, hydrochloric acid bath, or a mixture of the two can be used as a Fe-based electroplating bath. The cold-rolled steel sheet may also be subjected to Fe-based electroplating without oxidation treatment in a preheating furnace or the like. The term "pre-annealing Fe-based electroplated steel sheet" means that the Fe-based electroplating layer has not undergone an annealing process, and does not exclude the cold-rolled steel sheet having been annealed before subjection to Fe-based electroplating.

The Fe ion content in the Fe-based electroplating bath before the start of current passage is preferably 0.5 mol/L or more as $Fe^{2+}$. If the Fe ion content in the Fe-based electroplating bath is 0.5 mol/L or more as $Fe^{2+}$, a sufficient Fe coating weight can be obtained. In order to obtain a sufficient Fe coating weight, the Fe ion content in the Fe-based electroplating bath before the start of current passage is preferably 2.0 mol/L or less.

The Fe-based electroplating bath may contain Fe ions and at least one element selected from the group consisting of B, C, P, N, O, Ni, Mn, Mo, Zn, W, Pb, Sn, Cr, V, and Co. The total content of these elements in the Fe-based electroplating bath is preferably adjusted so that the total content of these elements in the pre-annealing Fe-based electroplating layer is 10 mass % or less. Metallic elements may be contained as metal ions, while non-metallic elements may be contained as part of, for example, boric acid, phosphoric acid, nitric acid, or organic acid. The iron sulfate plating solution may also contain conductivity aids such as sodium sulfate and potassium sulfate, chelating agents, or pH buffers.

Other conditions for the Fe-based electroplating bath are not also limited. The temperature of the Fe-based electroplating solution is preferably 30° C. or higher for constant temperature retention. The temperature is preferably 85° C. or lower for constant temperature retention. Although the pH of the Fe-based electroplating bath is not specified, it is preferably 1.0 or more from the viewpoint of preventing a decrease in current efficiency due to hydrogen generation. In addition, it is preferably 3.0 or less considering the electrical conductivity of the Fe-based electroplating bath. The current density is preferably 10 A/dm$^2$ or higher for productivity. It is preferably 150 A/dm$^2$ or lower for ease of control of coating weight of the Fe-based electroplating layer. The sheet passing speed is preferably 5 mpm or higher for productivity. It is preferably 150 mpm or lower for stable control of coating weight.

Prior to the Fe-based electroplating, degreasing and water washing may be performed to clean the surface of the cold-rolled steel sheet, and acid cleaning and water washing may also be performed to activate the surface of the cold-rolled steel sheet. Following these pretreatments, Fe-based electroplating is performed. The methods of degreasing and water washing are not limited, and conventional methods may be followed. Various acids such as sulfuric acid, hydrochloric acid, nitric acid, and mixtures of these acids can be used in the acid cleaning. Among these preferred are sulfuric acid, hydrochloric acid, or a mixture of these. Although the acid concentration is not specified, approximately 1 mass % to 20 mass % is preferable considering the ability to remove oxide coating and the prevention of rough skin (surface defects) due to over acid cleaning. The acid cleaning solution may also contain, for example, a defoamer, an acid cleaning promoter, or an acid cleaning inhibitor.

Then, after the Fe-based electroplating, the pre-annealing Fe-based electroplated steel sheet is subjected to an annealing process in which the sheet is cooled after being held in a temperature range of 650° C. to 900° C. for 30 seconds to 600 seconds in a reducing atmosphere with a dew point above −30° C. and a hydrogen concentration from 1.0 vol. % to 30.0 vol. %, to obtain an Fe-based electroplated steel sheet. The annealing process is performed to increase the strength of the steel sheet by relieving the stress in the pre-annealing Fe-based electroplated steel sheet caused by the rolling process and recrystallizing the microstructure of the pre-annealing Fe-based electroplated steel sheet.

Average Heating Rate: 10° C./Sec or Higher

Then, the pre-annealing Fe-based electroplated steel sheet is heated to a temperature range from 650° C. to 900° C. with an average heating rate of 10° C./second or higher in a temperature range from 400° C. to 650° C. (hereinafter referred to as the "heating process"). By setting the average heating rate in the heating process to 10° C./sec or higher, the growth of crystal grains in the Fe-based electroplating layer is reduced as much as possible during the heating process. This is because Si internal oxides hardly form at the crystal grain boundaries in the Fe-based electroplating layer during the heating process, as described below, and if the heating rate is less than 10° C./sec on average, the growth of crystal grains cannot be suppressed. While the growth of crystal grains in the Fe-based electroplating layer is suppressed as much as possible during the heating process, the crystals in the Fe-based electroplating layer can be made finer by annealing in an atmosphere with a dew point above −30° C., as described below. For example, a Direct Fired Furnace (DFF) or Non Oxidizing Furnace (NOF) can be used for the heating zone in the heating process. In the case of a radiant-tube heating furnace, a preliminary heating zone such as an induction heater (IH) may be installed in the preceding stage. The above average heating rate is based on the temperature measured on the surface of the Fe-based electroplated steel sheet.

Then, the pre-annealing Fe-based electroplated steel sheet is held in a temperature range from 650° C. to 900° C. for 30 seconds to 600 seconds in a reducing atmosphere with a dew point above −30° C. and a hydrogen concentration from 1.0 vol. % to 30.0 vol. %, and then cooled to obtain an Fe-based electroplated steel sheet. The annealing process is performed to increase the strength of the steel sheet by relieving the stress in the cold-rolled steel sheet caused by the rolling process and recrystallizing the microstructure of the cold-rolled steel sheet. In this process, internal oxides form at the grain boundaries in the Fe-based electroplating layer, which may suppress the growth of crystal grains in the Fe-based electroplating layer and make the crystal grains finer, resulting in the formation of a decarburized layer on the surface layer of the Fe-based electroplated steel sheet and reducing the C concentration in the surface layer.

Hydrogen Concentration: 1.0 Vol. % or More and 30.0 Vol. % or Less

The annealing process is performed in a reducing atmosphere with a hydrogen concentration of 1.0 vol. % or more and 30.0 vol. % or less. Hydrogen plays a role in suppressing the oxidation of Fe on the surface of the pre-annealing Fe-based electroplated steel sheet during the annealing process and activating the steel sheet surface. If the hydrogen concentration is 1.0 vol. % or higher, it is possible to avoid the deterioration of the coating or plating adhesion, which would otherwise be caused by the oxidation of Fe on the steel sheet surface when a galvanized layer is formed as described below. Therefore, the annealing process is performed in a reducing atmosphere with a hydrogen concentration of preferably 1.0 vol. % or more, and more preferably 2.0 vol. % or more. Although the upper limit of the hydrogen concentration in the annealing process is not particularly limited, from the cost perspective, the hydrogen concentration is preferably 30.0 vol. % or less, and more preferably 20.0 vol. % or less. The balance of the annealing atmosphere other than hydrogen is preferably nitrogen.

Dew Point: Above −30° C.

The dew point of the annealing atmosphere in the annealing process is set above −30° C. to form Si internal oxides at crystal grain boundaries in the Fe-based electroplating layer. It is preferable to control the dew point above −30° C. in the temperature range from 650° C. to 900° C. This enables the formation of Si internal oxides at crystal grain boundaries in the Fe-based electroplating layer while suppressing the growth of crystal grains in the Fe-based electroplating layer suppressed as much as possible with an average heating rate of 10° C./sec or higher during the heating process. By setting the dew point of the annealing atmosphere in the annealing process above −30° C., it is possible to accelerate the decarburization reaction and reduce the C concentration in the surface layer. The Si internal oxides present at the crystal grain boundaries in the Fe-based electroplating layer suppress the growth of crystal grains in the Fe-based electroplating layer during the annealing process due to their pinning effect. Since Si oxides are formed as a result of diffusion of Si from the cold-rolled steel sheet, the pinning effect of the Si internal oxides is particularly strong on the cold-rolled steel sheet side of the Fe-based electroplating layer. This is considered to reduce the crystal grain size especially on the interface side of the Fe-based electroplating layer with the Si-containing cold-rolled steel sheet, resulting in an increase in the number of grain boundaries in the Fe-based electroplating layer that are in contact with the interface with the Si-containing cold-rolled steel sheet. The pinning effect here refers to the Zener drag mechanism. When second-phase particles are dispersed in the microstructure and grain boundaries intersect the second-phase particles, energy is required for the grain boundaries to detach from the second-phase particles. In other words, there is a pinning force between the particles and the grain boundaries that prevents grain boundary migration, which suppresses the growth of crystal grains. Carbides and sulfides are well known as second-phase particles. It is not clear whether or not Si internal oxides exhibit this pinning effect, yet considering the experimental facts, it is presumed that they do. The dew point of the annealing atmosphere is preferably −20° C. or higher, and more preferably −5° C. or higher. Setting the dew point of the annealing atmosphere to −5° C. or higher provides particularly good resistance to cracking in resistance welding at a welded portion. In particular, this setup is particularly good in terms of preventing internal cracking. Although the upper limit of the dew point of the annealing atmosphere is not specified, the dew point of the annealing atmosphere is preferably 30° C. or lower to suitably prevent oxidation of the surface of the Fe-based electroplating layer and to ensure good coating or plating adhesion when forming a galvanized layer as described below.

Holding Time in Temperature Range from 650° C. to 900° C.: 30 Seconds to 600 Seconds In the annealing process, the holding time in the temperature range from 650° C. to 900° C. is preferably from 30 seconds to 600 seconds. By setting the holding time in this temperature range to 30 seconds or more, the natural oxide layer of Fe formed on the surface of the pre-annealing Fe-based electroplating layer can be suitably removed, and the coating or plating adhesion can be improved when a galvanized layer is formed on the steel sheet surface as described below. Therefore, the holding time in this temperature range is preferably 30 seconds or more. The upper limit of the holding time in this temperature range is not specified, yet from the viewpoint of productivity, the holding time in this temperature range is preferably 600 seconds or less.

Maximum Arrival Temperature of Pre-Annealing Fe-Based Electroplated Steel Sheet: 650° C. to 900° C.

The maximum arrival temperature of the pre-annealing Fe-based electroplated steel sheet is not particularly limited, yet it is preferably from 650° C. to 900° C. By setting the maximum arrival temperature of the pre-annealing Fe-based electroplated steel sheet to 650° C. or higher, recrystallization of the microstructure of the steel sheet can suitably proceed and the desired strength can be obtained. In addition, the natural oxide layer of Fe formed on the surface of the pre-annealing Fe-based electroplating layer can be suitably reduced, improving the coating adhesion when forming a hot-dip galvanized layer on the surface of the Fe-based electroplated steel sheet as described below. In addition, by setting the maximum arrival temperature of the Fe-based electroplated steel sheet to 900° C. or lower, the diffusion rate of Si and Mn in the steel is prevented from increasing too much and the diffusion of Si and Mn to the steel sheet surface can be prevented, making it possible to improve the coating adhesion when forming a hot-dip galvanized layer on the surface of the Fe-based electroplated steel sheet as described below. If the maximum arrival temperature is 900° C. or lower, damage to the heat treatment furnace can be prevented and costs can be reduced. Therefore, the maximum arrival temperature of the pre-annealing Fe-based electroplated steel sheet is preferably 900° C. or lower. The maximum arrival temperature is based on the temperature measured on the surface of the pre-annealing Fe-based electroplated steel sheet.

It is preferable that the coating weight $C.W._{FeO}$ (g/m$^2$) per surface of the pre-annealing Fe-based electroplating layer and the dew point D.P. (° C.) of the annealing atmosphere satisfy the formula (2) below. If the following formula (2) is satisfied, the effect of suppressing the intergranular penetration of molten zinc, the stress relaxation effect, the toughness degradation suppression effect, and the effect of reduction in the C concentration in the surface layer as a result of promotion of decarburization by the Fe-based electroplating layer will work in combination to achieve a more remarkable improvement in the resistance to cracking in resistance welding.

$$(C.W._{FeO})+(D.P._{FeO}) \geq 0 \quad (2)$$

As mentioned above, if the formula (2) is consequently satisfied, the resistance to cracking in resistance welding at a welded portion can be further improved. In another embodiment of the present disclosure, when the formula (2) is not satisfied, an additional process may be further performed to change the dew point D.P. (° C.) of the annealing atmosphere to satisfy the formula (2). This may more reliably improve the resistance to cracking in resistance welding at a welded portion. As an example of carrying out such a process during operation, it is conceivable to control the dew point of the atmosphere to be the determined dew point in the annealing process by changing the dew point D.P. in the annealing process to satisfy the formula (2) according to the value of the coating weight $C.W._{FeO}$ (g/m$^2$) per surface of the pre-annealing Fe-based electroplating layer. Specifically, the value of the coating weight $C.W._{FeO}$ (g/m$^2$) per surface of the pre-annealing Fe-based electroplating layer is substituted into the formula (2), and a dew point D.P. in the annealing process is determined to satisfy the formula (2). As used herein, substituting the value of the coating weight $C.W._{FeO}$ (g/m$^2$) per surface of the pre-annealing Fe-based electroplating layer into the formula (2) is not strictly limited to substituting the value into the formula exactly the same as the formula (2). This includes substituting the value into a narrower range of inequalities that always satisfy the formula (2). Through this control, for example, when the formula (3) is not satisfied as a result of the coating weight $C.W._{FeO}$ (g/m$^2$) per surface of the pre-annealing Fe-based electroplating layer being changed significantly in response to a change in the product specification of a continuously-passed steel sheet (when the formula is actually not satisfied or when a situation arises that prevents the formula from being satisfied), automatic control can be performed so that the formula is satisfied.

Since the control response of the dew point D.P. is worse than that of the coating weight $C.W._{FeO}$ per surface of the pre-annealing Fe-based electroplating layer, it is more preferable, in terms of control response, to change the coating weight $C.W._{FeO}$ per surface of the pre-annealing Fe-based electroplating layer to satisfy the formula (2), according to the value of the dew point D.P. In the case of a continuous annealing furnace, the coating weight $C.W._{FeO}$ per surface of the pre-annealing Fe-based electroplating layer in the Fe-based electroplating upstream of the annealing process is changed according to the value of the dew point D.P. in the annealing process. In this case, the production can be performed under the conditions satisfying the formula (2) for the part of a continuously-passed steel sheet where the coating weight $C.W._{FeO}$ per surface of the pre-annealing Fe-based electroplating layer has been changed.

As for the timing to change at least one of the coating weight $C.W._{FeO}$ per surface of the pre-annealing Fe-based electroplating layer or the dew point D.P. to satisfy the formula (2), in the case where Si-containing cold-rolled steel sheets of different product specifications are welded and continuously passed, it is preferable to change the coating weight $C.W._{FeO}$ per surface of the pre-annealing Fe-based electroplating layer or the dew point D.P. as the welded portion passes. In the case of changing the dew point D.P., it is more preferable to feed-forward control the amount of humidification in the furnace to satisfy the formula because of the poor response of the dew point D.P. as mentioned above.

As used herein, the "value of the coating weight $C.W._{FeO}$ (g/m$^2$) per surface of the pre-annealing Fe-based electroplating layer" may be a coating weight that would be obtained under the conditions adopted in the Fe-based electroplating (i.e., a target value), or a coating weight of the Fe-based electroplating layer actually obtained (i.e., a measured value). Similarly, the "value of the dew point D.P." may be either a target value or a measured value.

Some examples have been described above in the context of the method of producing a galvanized steel sheet being performed during operation. However, it is also possible to carry out a method of determining production conditions of a galvanized steel sheet, in which it is checked before the start of operation whether the target value of the coating weight $C.W._{FeO}$ (g/m$^2$) per surface of the pre-annealing Fe-based electroplating layer and the target value of the dew point D.P. satisfy the formula (2) or not, and if they do not satisfy the formula, at least one of the target value of the coating weight $C.W._{FeO}$ (g/m$^2$) per surface of the pre-annealing Fe-based electroplating layer or the target value of the dew point D.P. is changed before the start of operation. This method of determining production conditions may be implemented as part of or separately from the method of producing a galvanized steel sheet.

Next, the galvanization treatment will be described.

After the annealing process, the Fe-based electroplated steel sheet is subjected to galvanization treatment. The galvanization treatment is not limited to a particular method, yet may be, for example, hot dip coating, electroplating, cold spraying, or plasma spraying. In the case of hot-dip galvanization, in one example, the Fe-based electroplated steel sheet may be cooled after subjection to the annealing process and immersed in a hot-dip galvanizing bath to apply hot-dip galvanization to the steel sheet surface. The hot-dip galvanizing bath is composed of Al, Zn, and inevitable impurities. The composition of the hot-dip galvanizing bath is not specified. However, in general, the Al concentration in the bath is 0.05 mass % or more and 0.250 mass % or less. If the Al concentration in the bath is 0.05 mass % or more, bottom dross can be prevented, and thus dross can be prevented from causing a defect by adhering to the steel sheet. In addition, setting the Al concentration in the bath to 0.250 mass % or less prevents an increase in top dross and prevents dross from causing a defect by adhering to the steel sheet, while also reducing costs. Other conditions of the hot-dip galvanizing treatment are not restricted. However, for example, the bath temperature of the hot-dip galvanizing bath is normally set in the range of 440° C. to 500° C., and the steel sheet is immersed in the hot-dip galvanizing bath with the sheet temperature adjusted in the range of 440° C. to 550° C.

The coating weight per surface of the galvanized layer is preferably 25 g/m$^2$ or more. It is preferably 80 g/m$^2$ or less. By setting the coating weight per surface of the galvanized layer to 25 g/m$^2$ or more, the corrosion resistance can be further improved and the coating weight can be easily controlled. By setting the coating weight per surface of the galvanized layer to 80 g/m$^2$ or less, good coating or plating adhesion is obtained.

After the galvanization treatment, the coating weight may be adjusted accordingly. The method of adjusting the coating weight is not limited. However, for example, in the case of hot-dip galvanizing, the coating weight is generally adjusted by gas wiping. In one example, the coating weight is adjusted by the gas pressure of gas wiping and the distance between the wiping nozzle and the steel sheet. After the galvanization treatment, no alloying treatment is applied to the galvanized layer.

<Electrodeposition-Coated Steel Sheet>

According to this embodiment, it is also possible to provide an electrodeposition-coated steel sheet comprising: a chemical conversion layer formed on the galvanized layer of the aforementioned galvanized steel sheet; and an electrodeposition coating layer formed on the chemical conversion layer. The Fe-based electroplated steel sheet in this embodiment has excellent resistance to cracking in resistance welding at a welded portion. Therefore, an electrodeposition-coated steel sheet formed using the galvanized steel sheet disclosed herein is particularly suitable for application to automotive parts. The types of chemical conversion layer and electrodeposition coating layer are not limited, and publicly known chemical conversion layers and electrodeposition coating layers may be used. The chemical conversion layer may be, for example, a zinc phosphate layer or a zirconium layer. The electrodeposition coating layer is not limited as long as it is an electrodeposition layer for automotive use. The thickness of the electrodeposition layer varies depending on the application. However, it is preferably about 10 μm or more in the dry state. It is preferably about 30 μm or less in the dry state. According to this embodiment, it is also possible to provide a galvanized steel sheet for electrodeposition coating to apply electrodeposition coating.

<Method of Producing Electrodeposition-Coated Steel Sheet>

Next, a method of producing the aforementioned electrodeposition-coated steel sheet will be described below. The aforementioned electrodeposition-coated steel sheet may be produced by a method of producing an electrodeposition-coated steel sheet, the method comprising: subjecting the galvanized steel sheet to chemical conversion treatment to obtain a chemical-conversion-treated steel sheet with a chemical conversion layer formed on the galvanized layer; and subjecting the chemical-conversion-treated steel sheet to electrodeposition coating treatment to obtain an electrodeposition-coated steel sheet with an electrodeposition coating layer formed on the chemical conversion layer. Regarding the chemical conversion treatment and electrodeposition coating treatment, conventional methods may be followed. Prior to the chemical conversion treatment, degreasing, water washing, and if necessary, surface conditioning treatment may be performed to clean the surface of the galvanized steel sheet. These pretreatments are followed by the chemical conversion treatment. The methods of degreasing and water washing are not limited, and conventional methods may be followed. In the surface conditioning treatment, surface conditioners containing Ti colloids or zinc phosphate colloids can be used. Regarding the application of these surface conditioners, no special process is required and conventional methods may be followed. For example, the desired surface conditioner is dissolved in a certain deionized water and stirred thoroughly to obtain a treatment solution at a predetermined temperature (usually room temperature, i.e., 25° C. to 30° C.). Then, the steel sheet is immersed in the obtained treatment solution for a predetermined time (e.g., 20 seconds to 30 seconds). The steel sheet is then subjected to the subsequent chemical conversion treatment without being dried. Regarding the chemical conversion treatment, conventional methods may be followed. For example, the desired chemical conversion treatment agent is dissolved in a certain deionized water and stirred thoroughly to obtain a treatment solution at a predetermined temperature (usually 35° C. to 45° C.). Then, the steel sheet is immersed in the obtained treatment solution for a predetermined time (e.g., 60 seconds to 120 seconds). As the chemical conversion treatment agent, for example, a zinc phosphate treatment agent for steel, a zinc phosphate treatment agent for combined use of steel and aluminum, or a zirconium treatment agent may be used. The steel sheet is then subjected to the subsequent electrodeposition coating. Regarding the electrodeposition coating, conventional methods may be followed. After pretreatment such as water washing, if necessary, the steel sheet is immersed in an electrodeposition coating material that has been thoroughly stirred to obtain an electrodeposition coating with the desired thickness through electrodeposition treatment. As the electrodeposition coating, anionic electrodeposition coating as well as cationic electrodeposition coating can be used. Furthermore, for example, top coating may be applied after the electrodeposition coating, depending on the application.

<Automotive Part>

According to this embodiment, it is also possible to provide an automotive part that is at least partially made from the electrodeposition-coated steel sheet described above. The galvanized steel sheet in this embodiment has excellent resistance to cracking in resistance welding at a welded portion. Therefore, an electrodeposition-coated steel sheet formed using the galvanized steel sheet disclosed herein is particularly suitable for application to automotive parts. The automotive part made from the electrodeposition-coated steel sheet may contain a steel sheet other than the electrodeposition-coated steel sheet as the raw material. Since the electrodeposition-coated steel sheet in this embodiment has excellent resistance to cracking in resistance welding at a welded portion, LME cracking is suitably prevented from occurring at a welded portion of the automotive part made from the galvanized steel sheet. The types of the automotive part at least partially made from the electrodeposition-coated steel sheet are not limited. However, the automotive part may be, for example, a side sill part, a pillar part, or an automotive body.

The present disclosure will be specifically described based on the examples below.

Example 1

Cast steel samples were prepared by smelting steel with the chemical compositions listed in Tables 1 and 3, and subjected to hot rolling, acid cleaning, and cold rolling to obtain cold-rolled steel sheets with a thickness of 1.6 mm.

TABLE 1

| Steel sample ID | C | Si | Mn | P | S | N | Al | B | Ti | Nb | Mo | Cu | Ni | |
|---|---|---|---|---|---|---|---|---|---|---|---|---|---|---|
| A | 0.18 | 0.41 | 1.55 | 0.02 | 0.002 | 0.004 | 0.039 | 0.001 | 0.01 | — | — | — | — | Conforming steel |
| B | 0.15 | 0.91 | 2.16 | 0.02 | 0.002 | 0.004 | 0.036 | — | — | — | — | — | — | Conforming steel |
| C | 0.18 | 1.02 | 3.08 | 0.02 | 0.002 | 0.006 | 0.038 | 0.001 | 0.01 | 0.018 | — | — | — | Conforming steel |
| D | 0.12 | 1.20 | 1.85 | 0.01 | 0.001 | 0.004 | 0.032 | 0.001 | 0.01 | — | — | — | — | Conforming steel |
| E | 0.24 | 1.41 | 1.33 | 0.01 | 0.001 | 0.003 | 0.034 | 0.001 | 0.01 | — | — | — | — | Conforming steel |
| F | 0.13 | 1.39 | 1.94 | 0.01 | 0.001 | 0.007 | 0.033 | 0.001 | 0.01 | — | — | — | — | Conforming steel |
| G | 0.08 | 1.49 | 1.52 | 0.01 | 0.001 | 0.003 | 0.035 | 0.001 | 0.01 | — | — | — | — | Conforming steel |
| H | 0.17 | 1.53 | 2.31 | 0.01 | 0.001 | 0.004 | 0.037 | — | — | — | 0.11 | — | — | Conforming steel |
| I | 0.19 | 1.51 | 2.72 | 0.01 | 0.001 | 0.004 | 0.034 | 0.001 | 0.01 | — | — | 0.12 | — | Conforming steel |
| J | 0.15 | 1.65 | 1.33 | 0.02 | 0.002 | 0.005 | 0.036 | 0.001 | 0.01 | — | — | — | 0.14 | Conforming steel |
| K | 0.17 | 1.68 | 2.51 | 0.03 | 0.002 | 0.004 | 0.036 | 0.001 | 0.01 | — | — | — | — | Conforming steel |

"—" indicates a content at inevitable impurity level.

TABLE 3

| Steel sample ID | C | Si | Mn | P | S | N | Al | B | Ti | Cr | Nb | Mo | Cu | Ni | |
|---|---|---|---|---|---|---|---|---|---|---|---|---|---|---|---|
| L | 0.11 | 0.52 | 2.56 | 0.01 | 0.001 | 0.003 | 0.033 | 0.001 | 0.01 | 0.59 | — | — | — | — | Conforming steel |
| M | 0.09 | 0.61 | 2.69 | 0.03 | 0.002 | 0.005 | 0.037 | 0.001 | 0.01 | — | — | — | — | — | Conforming steel |

"—" indicates a content at inevitable impurity level.

Then, each cold-rolled steel sheet was subjected to degreasing with alkali, followed by electrolytic treatment with the steel sheet as the cathode under the conditions described below to produce a pre-annealing Fe-based electroplated steel sheet having a Fe-based electroplating layer on one surface. The coating weight of the Fe-based electroplating layer was controlled by welding time. Subsequently, the pre-annealing Fe-based electroplated steel sheets were subjected to reduction annealing with 15% $H_2$—$N_2$, and at a soaking zone temperature of 800° C., while adjusting the dew point of the atmosphere as listed in Tables 2-1, 2-2, and 4, to obtain Fe-based electroplated steel sheets. The obtained Fe-based electroplated steel sheets were cooled down to 440° C. to 550° C., and then hot-dip galvanized using a hot-dip galvanizing bath at 460° C., where the effective Al concentration in the bath was 0.197 mass % with the balance being Zn and inevitable impurities. Subsequently, the coating amount was adjusted to approximately 50 g/m$^2$ per surface by gas wiping to produce galvanized steel sheet samples.

[Electrolytic Conditions]
Bath temperature: 50° C.
pH: 2.0
Current density: 45 A/dm$^2$
Fe-based electroplating bath: containing 1.5 mol/L of $Fe^{2+}$ ions
Electrode (anode): iridium oxide electrode From each galvanized steel sheet thus prepared, the coating weight per surface of the Fe-based electroplating layer, $I_{Si,Fe}/I_{Si,bulk}$, and the number of crystal grain boundaries in the Fe-based electroplating layer that were in contact with the Si-containing cold-rolled steel sheet at the interface between the Fe-based electroplating layer and the Si-containing cold-rolled steel sheet were determined according to the method described above.

Using each galvanized steel sheet thus prepared, the C intensity was measured by performing surface analysis on a cross-section of the sample according to the method described above, and the average C concentration in the region ranging from 10 μm to 20 μm in the thickness direction from the interface between the galvanized layer and the Fe-based electroplating layer towards the Fe-based electroplating layer and the depth of the decarburized layer were evaluated.

The resistance to cracking in resistance welding at a welded portion was also investigated for each galvanized steel sheet thus obtained. The methods of measuring and evaluating the resistance to cracking in resistance welding at a welded portion will be described below.

<Resistance to Cracking in Resistance Welding at Welded Portion>

For each galvanized steel sheet, the resistance to cracking in resistance welding at a welded portion was evaluated when combined with a test galvannealed steel sheet (1.6 mm thick) having a tensile strength of 980 MPa and a coating weight per surface of 50 g/m$^2$, with a Si content of 0.50% or less, where the resistance to cracking in resistance welding was not an issue at a holding time of 0.18 seconds. The evaluation method of the resistance to cracking in resistance welding at a welded portion will be described below with reference to FIGS. 11A and 11B.

Figure 11A:
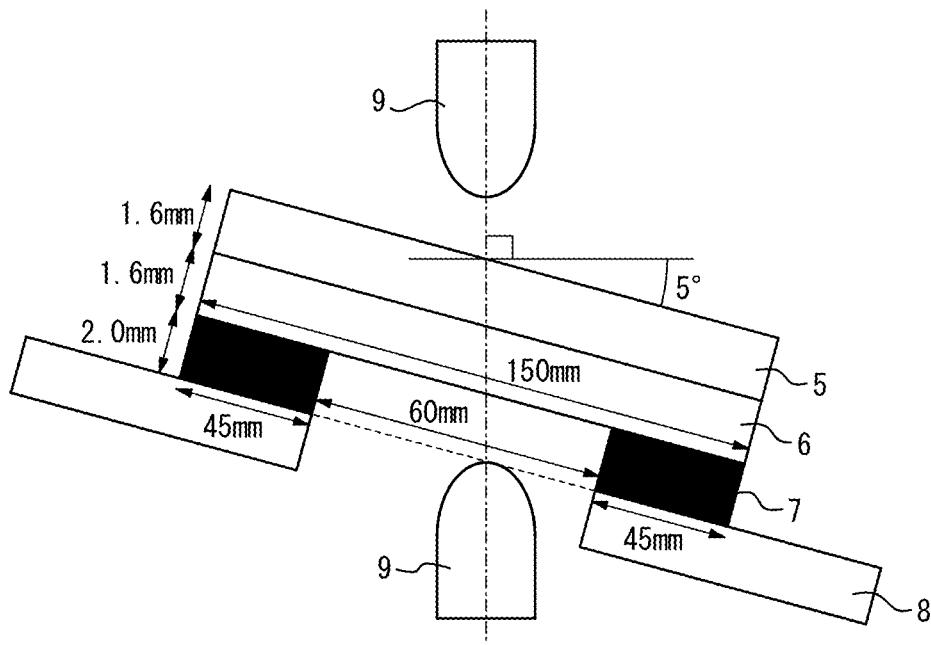
FIG. 11A illustrates evaluation of resistance to cracking in resistance welding at a welded portion.

As a sheet combination, a test specimen 6 that was cut to a size of 50 mm×150 mm with the transverse direction ("TD", direction orthogonal to the rolling direction) as the lengthwise direction and the rolling direction as the widthwise direction was overlapped with a test galvannealed steel sheet 5 that was cut to the same size having a hot-dip galvanized layer with a coating weight per surface of 50 g/m$^2$. The sheet combination was assembled so that the surface to be evaluated (i.e., Fe-based electroplating layer side) of the test specimen 6 and the galvanized layer of the test hot-dip galvanized steel sheet 5 faced each other. The sheet combination was fixed to a fixing stand 8 via spacers 7 of 2.0 mm thick. The spacers 7 were a pair of steel sheets, each measuring 50 mm long (lengthwise direction)×45 mm wide (widthwise direction)×2.0 mm thick (thickness direction). As illustrated in FIG. 11A, the lengthwise end faces of the pair of steel sheets are aligned with the widthwise end faces of the sheet combination. Thus, the distance between the pair of steel sheets was 60 mm. The fixing stand 8 was a single plate with a hole in the center.

Figure 11B:
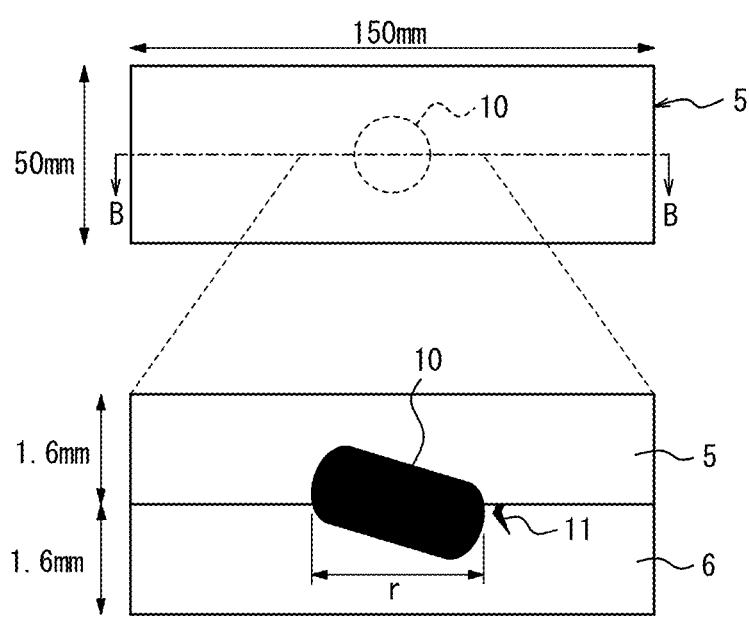
FIG. 11B illustrates a top view of a sheet combination after welding in the evaluation in the upper part, and a B-B cross-section in the lower part.

Then, using a single-phase AC (50 Hz) resistance welding machine of servomotor pressure type, the sheet combination was subjected to resistance welding at a welding current that resulted in a nugget diameter r of 5.9 mm while being deflected by applying pressure with a pair of electrodes 9 (tip diameter: 6 mm) under the conditions of an electrode force of 3.5 kN, a holding time of 0.18 seconds or 0.24 seconds, and a welding time of 0.36 seconds, to form a sheet combination with a welded portion. The pair of electrodes 9 pressurized the sheet combination from above and below in the vertical direction, with the lower electrode pressurizing the test specimen 6 through the hole in the fixing stand 8. In applying pressure, the lower electrode of the pair of electrodes 9 and the fixing stand 8 were fixed, and the upper electrode was movable so that the lower electrode was in contact with a plane that was an extension of a plane where the spacer 7 touched the fixing stand 8. The upper electrode was in contact with the center of the test galvannealed steel sheet 5. The sheet combination was welded with an inclination of 5° lengthwise with respect to the horizontal direction. The holding time refers to the time between the end of passage of the welding current and the beginning of electrode release. As illustrated in FIG. 11B, the nugget diameter r means the distance between the ends of a nugget 10 in the lengthwise direction of the sheet combination.

Then, each sheet combination with a welded portion was cut along the B-B line shown in the upper part of FIG. 11B to include the center of the welded portion including a nugget 10, and the cross-section of the welded portion was observed under an optical microscopy (200×) to evaluate the resistance to cracking in resistance welding at the welded portion using the following criteria. The result of ⊚ or ○ indicates that the sheet combination was judged to have superior resistance to cracking in resistance welding at the welded portion. The result of x indicates that the sheet combination was judged to have inferior resistance to cracking in resistance welding at the welded portion.
- ⊚: no cracks as long as 0.1 mm or more were observed at a holding time of 0.18 seconds.
- ○: cracks as long as 0.1 mm or more were observed at a holding time of 0.18 seconds, but no cracks as long as 0.1 mm or more were observed at a holding time of 0.24 seconds.
- x: cracks as long as 0.1 mm or more were observed at a holding time of 0.24 seconds.

A crack in the test specimen 6 is schematically illustrated in the lower part of FIG. 11B, as indicated by reference numeral 11. If a crack forms in the counterpart steel sheet (test galvannealed steel sheet), the stress in the steel sheet to be evaluated (any of the steel sheets in our examples and comparative examples) will be distributed, and the evaluation will not be appropriate. For this reason, the data in which no cracking occurred in the counterpart steel sheet was used as our examples.

The results of the above tests are listed in Tables 2-1, 2-2, and 4. The results demonstrate that all of the galvanized steel sheets in our examples, in which Fe-based electroplating layers were formed under the conditions conforming to the present disclosure before continuous annealing, exhibited excellent resistance to cracking in resistance welding at a welded portion. In Reference Examples 1 and 2, no particular problems were observed in the resistance to cracking in resistance welding at a welded portion since the Si content was less than 0.50%. In each of our examples satisfying the formulas (1) and (2), cracks as long as 0.1 mm or more were not observed even at a holding time of 0.18 seconds, and the resistance to cracking in resistance welding at a welded portion was particularly good. In the table, the coating weight is indicated as "-" for the cases where no Fe-based electroplating layer was formed, and in these cases the peak(s) of emission intensity at wavelengths indicating Si (referred to as "Si intensity peak" for convenience in the table) and the number of crystalline grain boundaries in the Fe-based electroplating layer that were in contact with the Si-containing cold-rolled steel sheet at the interface between the Fe-based electroplating layer and the Si-containing cold-rolled steel sheet (referred to as "Number of grain boundaries in contact with steel substrate" for convenience in the table) were both not measurable, and are also indicated as "-". For those steel sheets with a decarburized layer having a thickness of less than 10 μm, the thickness of the decarburized layer is indicated as "-". When any variable on the left side of the formulas (1) and (2) was "-", the left side of the formulas (1) and (2) was calculated with the variable set to 0.

TABLE 2

| | | Pre-annealing | | | Fe-based electroplating layer | | C concentration in surface layer of Fe-based electroplating layer Thickness of decarburized layer μm |
|---|---|---|---|---|---|---|---|
| No. | Steel sample ID | Fe-based electroplating layer Coating weight g/m² | Heating Average rate ° C./sec | Annealing Dew point ° C. | $I_{Si,\,Fe}/I_{Si,\,bulk}$ — | Number of grain boundaries in contact with steel substrate counts | |
| 1 | A | — | 5.0 | −41 | — | — | — |
| 2 | A | 4.3 | 12.0 | −38 | 0.15 | 4 | — |
| 3 | B | — | 15.0 | −18 | — | — | — |
| 4 | B | 2.8 | 10.5 | −3 | 0.64 | 13 | 70 |
| 5 | B | 5.7 | 20.0 | −7 | 0.77 | 15 | 67 |
| 6 | B | 10.7 | 15.0 | 3 | 0.70 | 18 | 82 |
| 7 | C | — | 20.0 | −17 | — | — | 41 |
| 8 | C | 4.4 | 7.5 | −21 | 0.63 | 9 | 38 |
| 9 | C | 5.8 | 7.5 | −18 | 0.58 | 6 | 43 |
| 10 | C | 8.3 | 12.0 | −18 | 0.60 | 16 | 46 |
| 11 | C | 7.6 | 10.5 | 5 | 0.51 | 19 | 69 |
| 12 | D | — | 10.5 | 2 | — | — | 82 |
| 13 | D | 5.8 | 10.5 | −33 | 0.33 | 3 | — |
| 14 | D | 6.0 | 10.5 | 4 | 0.88 | 15 | 88 |

TABLE 2-continued

| | | | | | | | |
|---|---|---|---|---|---|---|---|
| 15 | D | 11.2 | 10.5 | −17 | 0.84 | 20 | 58 |
| 16 | E | — | 15.0 | 5 | — | — | 47 |
| 17 | E | 12.5 | 15.0 | 12 | 0.99 | 30 | 60 |
| 18 | E | 18.1 | 15.0 | 9 | 0.58 | 2 | 59 |
| 19 | E | 24.5 | 15.0 | −28 | 0.50 | 15 | 33 |
| 20 | E | 31.3 | 15.0 | −24 | 0.52 | 10 | 37 |
| 21 | F | — | 8.5 | −4 | — | — | 72 |
| 22 | F | 4.2 | 20.0 | −5 | 1.01 | 18 | 76 |
| 23 | F | 9.2 | 15.0 | −6 | 0.87 | 11 | 74 |
| 24 | F | 8.9 | 12.0 | 8 | 0.93 | 20 | 92 |
| 25 | F | 12.2 | 10.5 | −4 | 0.78 | 16 | 83 |
| 26 | G | — | 7.5 | −8 | — | — | — |
| 27 | G | 8.8 | 2.0 | −26 | 0.64 | 7 | — |
| 28 | G | 14.2 | 10.5 | −11 | 0.71 | 17 | 86 |
| 29 | G | 12.6 | 15.0 | 6 | 0.69 | 22 | 110 |
| 30 | G | 14.0 | 12.0 | 4 | 0.81 | 31 | 106 |
| 31 | H | — | 10.5 | −16 | — | — | 45 |
| 32 | H | 5.1 | 10.5 | −7 | 0.97 | 16 | 60 |
| 33 | H | 5.3 | 10.5 | 4 | 1.13 | 12 | 70 |
| 34 | H | 10.3 | 10.5 | −4 | 0.86 | 21 | 63 |
| 35 | H | 9.8 | 10.5 | 6 | 0.88 | 15 | 78 |
| 36 | H | 15.8 | 10.5 | −37 | 0.42 | 1 | 22 |
| 37 | H | 16.3 | 10.5 | −13 | 0.61 | 15 | 57 |
| 38 | H | 14.3 | 15.0 | 1 | 0.71 | 22 | 70 |
| 39 | H | 16.1 | 10.5 | 11 | 0.65 | 18 | 82 |
| 40 | H | 12.8 | 12.0 | 19 | 0.83 | 35 | 91 |
| 41 | H | 15.9 | 12.0 | −5 | 0.96 | 23 | 67 |
| 42 | I | — | 20.0 | −22 | — | — | 29 |
| 43 | I | 4.1 | 20.0 | −38 | 0.39 | 4 | — |
| 44 | I | 10.3 | 20.0 | −26 | 0.53 | 10 | 32 |
| 45 | I | 14.6 | 20.0 | 16 | 0.56 | 26 | 79 |
| 46 | I | 39.3 | 20.0 | 9 | 0.51 | 17 | 80 |
| 47 | J | — | 10.5 | 4 | — | — | 79 |
| 48 | J | 3.9 | 10.5 | −1 | 1.25 | 23 | 74 |
| 49 | J | 6.5 | 10.5 | 6 | 0.94 | 18 | 86 |
| 50 | J | 20.0 | 10.5 | −5 | 0.73 | 15 | 78 |
| 51 | J | 10.9 | 10.5 | 14 | 0.84 | 33 | 98 |
| 52 | K | — | 12.0 | 1 | — | — | 65 |
| 53 | K | 3.4 | 12.0 | −11 | 0.60 | 13 | 51 |
| 54 | K | 7.7 | 12.0 | 2 | 0.76 | 15 | 72 |
| 55 | K | 16.1 | 12.0 | −20 | 0.56 | 11 | 49 |
| 56 | K | 15.0 | 12.0 | 9 | 0.86 | 25 | 83 |

| No. | C concentration in surface layer of Fe-based electroplating layer Concentration mass % | Resistance to cracking in resistance welding | Tensile strength TS MPa | Formula (1) Left side | Formula (2) Left side | Remarks |
|---|---|---|---|---|---|---|
| 1 | 0.18 | ⊚ | 605 | – | −41 | Reference example |
| 2 | 0.17 | ⊚ | 613 | 6.9 | −34 | Reference example |
| 3 | 0.13 | X | 953 | — | −18 | Comparative example |
| 4 | 0.08 | XX | 947 | 74.5 | 0 | Comparative example |
| 5 | 0.08 | ○ | 955 | 76.1 | −1 | Example |
| 6 | 0.04 | ⊚ | 958 | 99.1 | 14 | Example |
| 7 | 0.12 | X | 1193 | 41.0 | −17 | Comparative example |
| 8 | 0.12 | XX | 1199 | 45.0 | −17 | Comparative example |
| 9 | 0.11 | XX | 1202 | 52.3 | −12 | Comparative example |
| 10 | 0.10 | ○ | 1204 | 59.3 | −10 | Example |
| 11 | 0.04 | ⊚ | 1186 | 81.2 | 13 | Example |
| 12 | 0.06 | X | 860 | 82.0 | 2 | Comparative example |
| 13 | 0.12 | XX | 869 | 9.3 | −27 | Comparative example |
| 14 | 0.04 | ⊚ | 865 | 97.6 | 10 | Example |
| 15 | 0.08 | ○ | 866 | 75.9 | −6 | Example |
| 16 | 0.05 | X | 846 | 47.0 | 5 | Comparative example |
| 17 | 0.01 | ⊚ | 848 | 80.0 | 25 | Example |
| 18 | 0.01 | ⊚ | 844 | 88.0 | 27 | Example |
| 19 | 0.08 | ○ | 846 | 72.2 | −4 | Example |
| 20 | 0.05 | ⊚ | 841 | 87.1 | 7 | Example |
| 21 | 0.08 | X | 957 | 72.0 | −4 | Comparative example |
| 22 | 0.09 | XX | 956 | 82.7 | −1 | Comparative example |
| 23 | 0.06 | ⊚ | 966 | 88.7 | 3 | Example |
| 24 | 0.02 | ⊚ | 964 | 106.2 | 17 | Example |
| 25 | 0.04 | ⊚ | 968 | 102.5 | 8 | Example |
| 26 | 0.08 | X | 854 | — | −8 | Comparative Example |
| 27 | 0.08 | XX | 856 | — | −17 | Comparative example |
| 28 | 0.06 | ⊚ | 858 | 108.7 | 3 | Example |
| 29 | 0.03 | ⊚ | 852 | 130.2 | 19 | Example |
| 30 | 0.02 | ⊚ | 856 | 128.4 | 18 | Example |
| 31 | 0.12 | X | 1005 | 45.0 | −16 | Comparative example |

TABLE 2-continued

| | | | | | | |
|---|---|---|---|---|---|---|
| 32 | 0.08 | ○ | 1011 | 68.2 | −2 | Example |
| 33 | 0.05 | ⊚ | 1016 | 78.5 | 9 | Example |
| 34 | 0.05 | ⊚ | 1004 | 79.5 | 6 | Example |
| 35 | 0.02 | ⊚ | 1015 | 93.7 | 16 | Example |
| 36 | 0.13 | X | 1008 | 47.3 | −21 | Comparative example |
| 37 | 0.06 | ⊚ | 1012 | 83.1 | 3 | Example |
| 38 | 0.03 | ⊚ | 1009 | 92.9 | 13 | Example |
| 39 | 0.03 | ⊚ | 999 | 107.8 | 27 | Example |
| 40 | 0.01 | ⊚ | 1001 | 111.5 | 32 | Example |
| 41 | 0.04 | ⊚ | 1003 | 92.4 | 11 | Example |
| 42 | 0.14 | X | 1040 | 29.0 | −22 | Comparative example |
| 43 | 0.18 | X | 1042 | 6.6 | −34 | Comparative example |
| 44 | 0.09 | ○ | 1047 | 48.5 | −16 | Example |
| 45 | 0.01 | ⊚ | 1049 | 102.4 | 31 | Example |
| 46 | 0.01 | ⊚ | 1044 | 142.9 | 48 | Example |
| 47 | 0.06 | X | 840 | 79.0 | 4 | Comparative example |
| 48 | 0.06 | X | 843 | 80.2 | 3 | Comparative example |
| 49 | 0.03 | ⊚ | 836 | 96.4 | 13 | Example |
| 50 | 0.03 | ⊚ | 846 | 110.0 | 15 | Example |
| 51 | 0.01 | ⊚ | 847 | 115.4 | 25 | Example |
| 52 | 0.07 | X | 1039 | 65.0 | 1 | Comparative example |
| 53 | 0.10 | X | 1040 | 56.4 | −8 | Comparative example |
| 54 | 0.04 | ⊚ | 1028 | 84.3 | 10 | Example |
| 55 | 0.08 | ○ | 1042 | 74.8 | −4 | Example |
| 56 | 0.01 | ⊚ | 1031 | 107.0 | 24 | Example |

Underlined if outside the appropriate range of the present disclosure.

TABLE 4

| | | Pre-annealing | | | Fe-based electroplating layer | | C concentration in surface layer of Fe-based electroplating layer Thickness of decarburized layer μm |
|---|---|---|---|---|---|---|---|
| No. | Steel sample ID | Fe-based electroplating layer Coating weight g/m² | Heating Average rate °C./sec | Annealing Dew point °C. | $I_{Si, Fe}/I_{Si, bulk}$ | Number of grain boundaries in contact with steel substrate counts | |
| 1 | L | 5.2 | 10.5 | −11 | 0.57 | 13 | 58 |
| 2 | L | 10.5 | 12.0 | 5 | 0.68 | 20 | 85 |
| 3 | L | 23.4 | 15.0 | −14 | 0.55 | 13 | 73 |
| 4 | M | 5.4 | 20.0 | −7 | 0.70 | 16 | 66 |
| 5 | M | 11.1 | 10.5 | −6 | 0.72 | 14 | 68 |
| 6 | M | 21.6 | 15.0 | 1 | 0.76 | 24 | 92 |

| No. | C concentration in surface layer of Fe-based electroplating layer Concentration mass % | Resistance to cracking in resistance welding | Tensile strength TS MPa | Formula (1) Left side | Formula (2) Left side | Remarks |
|---|---|---|---|---|---|---|
| 1 | 0.08 | ○ | 1084 | 66.3 | −6 | Example |
| 2 | 0.04 | ⊚ | 1086 | 101.8 | 16 | Example |
| 3 | 0.07 | ⊚ | 1087 | 110.4 | 9 | Example |
| 4 | 0.05 | ○ | 990 | 74.6 | −2 | Example |
| 5 | 0.05 | ⊚ | 993 | 85.8 | 5 | Example |
| 6 | 0.02 | ⊚ | 987 | 126.6 | 23 | Example |

Example 2

Cast steel samples were prepared by smelting steel with the chemical compositions listed in Table 5, and subjected to hot rolling, acid cleaning, and cold rolling to obtain cold-rolled steel sheets with a thickness of 1.6 mm.

TABLE 5

| Steel sample ID | C | Si | Mn | P | S | N | Al | B | Ti | Cr | Nb | Mo | Cu | Ni | |
|---|---|---|---|---|---|---|---|---|---|---|---|---|---|---|---|
| N | 0.09 | 0.21 | 2.72 | 0.02 | 0.001 | 0.004 | 0.034 | 0.001 | 0.01 | — | 0.014 | — | — | — | Conforming steel |
| O | 0.12 | 0.46 | 2.51 | 0.01 | 0.002 | 0.003 | 0.035 | 0.001 | 0.01 | — | — | — | — | — | Conforming steel |

"—" indicates a content at inevitable impurity level.

Then, each cold-rolled steel sheet was subjected to degreasing with alkali, followed by electrolytic treatment with the steel sheet as the cathode under the conditions described below to produce a pre-annealing Fe-based electroplated steel sheet having a Fe-based electroplating layer on one surface. The coating weight of the Fe-based electroplating layer was controlled by welding time. Subsequently, the pre-annealing Fe-based electroplated steel sheets were subjected to reduction annealing with 15% $H_2$—$N_2$, and at a soaking zone temperature of 800° C., while adjusting the dew point of the atmosphere as listed in Table 2. The reduction annealing was performed for 100 seconds, to obtain Fe-based electroplated steel sheets. The obtained Fe-based electroplated steel sheets were cooled to 440° C. to 550° C., and then hot-dip galvanized using a hot-dip galvanizing bath at 460° C., where the effective Al concentration in the bath was 0.197 mass % with the balance being Zn and inevitable impurities. Subsequently, the coating amount was adjusted to approximately 50 g/m² per surface by gas wiping to produce galvanized steel sheet samples.

[Electrolytic Conditions]
 Bath temperature: 50° C.
 pH: 2.0
 Current density: 45 A/dm²
 Fe-based electroplating bath: containing 1.5 mol/L of $Fe^{2+}$ ions
 Electrode (anode): iridium oxide electrode From each galvanized steel sheet thus prepared, the coating weight per surface of the Fe-based electroplating layer, $I_{Si,Fe}/I_{Si,bulk}$, and the number of crystal grain boundaries in the Fe-based electroplating layer that were in contact with the Si-containing cold-rolled steel sheet at the interface between the Fe-based electroplating layer and the Si-containing cold-rolled steel sheet were determined according to the method described above.

Using each galvanized steel sheet thus prepared, the C intensity was measured by performing surface analysis on a cross-section of the sample according to the method described above, and the average C concentration in the region ranging from 10 μm to 20 μm in the thickness direction from the interface between the galvanized layer and the Fe-based electroplating layer towards the Fe-based electroplating layer and the depth of the decarburized layer were evaluated.

The resistance to cracking in resistance welding at a welded portion was also investigated for each galvanized steel sheet thus obtained. The methods of measuring and evaluating the resistance to cracking in resistance welding at a welded portion will be described below.

<Resistance to Cracking in Resistance Welding at Welded Portion>

For each galvanized steel sheet, the resistance to cracking in resistance welding at a welded portion was evaluated when combined with a test galvannealed steel sheet (1.6 mm thick) having a tensile strength of 590 MPa and a coating weight per surface of 50 g/m², with a Si content of less than 0.1%, where the resistance to cracking in resistance welding was not an issue at a holding time of 0.14 seconds. The evaluation method of the resistance to cracking in resistance welding at a welded portion will be described below with reference to FIGS. 11A and 11B.

As a sheet combination, a test specimen 6 that was cut to a size of 50 mm×150 mm with the transverse direction ("TD", direction orthogonal to the rolling direction) as the lengthwise direction and the rolling direction as the widthwise direction was overlapped with a test galvannealed steel sheet 5 that was cut to the same size having a hot-dip galvanized layer with a coating weight per surface of 50 g/m². The sheet combination was assembled so that the surface to be evaluated (i.e., Fe-based electroplating layer side) of the test specimen 6 and the galvanized layer of the test hot-dip galvanized steel sheet 5 faced each other. The sheet combination was fixed to a fixing stand 8 via spacers 7 of 2.0 mm thick. The spacers 7 were a pair of steel sheets, each measuring 50 mm long (lengthwise direction)×45 mm wide (widthwise direction)×2.0 mm thick (thickness direction). As illustrated in FIG. 11A, the lengthwise end faces of the pair of steel sheets are aligned with the widthwise end faces of the sheet combination. Thus, the distance between the pair of steel sheets was 60 mm. The fixing stand 8 was a single plate with a hole in the center.

Then, using a single-phase AC (50 Hz) resistance welding machine of servomotor pressure type, the sheet combination was subjected to resistance welding at a welding current that resulted in a nugget diameter r of 5.9 mm while being deflected by applying pressure with a pair of electrodes 9 (tip diameter: 6 mm) under the conditions of an electrode force of 3.5 kN, a holding time of 0.14 seconds or 0.16 seconds, and a welding time of 0.36 seconds, to form a sheet combination with a welded portion. The pair of electrodes 9 pressurized the sheet combination from above and below in the vertical direction, with the lower electrode pressurizing the test specimen 6 through the hole in the fixing stand 8. In applying pressure, the lower electrode of the pair of electrodes 9 and the fixing stand 8 were fixed, and the upper electrode was movable so that the lower electrode was in contact with a plane that was an extension of a plane where the spacer 7 touched the fixing stand 8. The upper electrode was in contact with the center of the test galvannealed steel sheet 5. The sheet combination was welded with an inclination of 5° lengthwise with respect to the horizontal direction. The holding time refers to the time between the end of passage of the welding current and the beginning of electrode release. As illustrated in the lower part of FIG.

11B, the nugget diameter r means the distance between the ends of a nugget 10 in the lengthwise direction of the sheet combination.

Then, each sheet combination with a welded portion was cut along the B-B line shown in the upper part of FIG. 11B to include the center of the welded portion including a nugget 10, and the cross-section of the welded portion was observed under an optical microscopy (200×) to evaluate the resistance to cracking in resistance welding at the welded portion using the following criteria. The result of ⊚ or ○ indicates that the sheet combination was judged to have superior resistance to cracking in resistance welding at the welded portion. The result of x indicates that the sheet combination was judged to have inferior resistance to cracking in resistance welding at the welded portion.
- ⊚: no cracks as long as 0.1 mm or more were observed at a holding time of 0.14 seconds.
- ○: cracks as long as 0.1 mm or more were observed at a holding time of 0.14 seconds, but no cracks as long as 0.1 mm or more were observed at a holding time of 0.16 seconds.
- x: cracks as long as 0.1 mm or more were observed at a holding time of 0.16 seconds.

A crack in the test specimen 6 is schematically illustrated in the lower part of FIG. 11B, as indicated by reference numeral 11. If a crack forms in the counterpart steel sheet (test galvannealed steel sheet), the stress in the steel sheet to be evaluated (each of the steel sheets in our examples and comparative examples) will be distributed, and the evaluation will not be appropriate. For this reason, the data in which no cracking occurred in the counterpart steel sheet was used in our examples.

The results of the above tests are listed in Table 6. The results demonstrate that all of the galvanized steel sheets in our examples, in which Fe-based electroplating layers were formed under the conditions conforming to the present disclosure before continuous annealing, exhibited excellent resistance to cracking in resistance welding at a welded portion. In each of our examples satisfying the formulas (1) and (2), cracks as long as 0.1 mm or more were not observed even at a holding time of 0.14 seconds, and the resistance to cracking in resistance welding at a welded portion was particularly good. In the table, the coating weight is indicated as "-" for the cases where no Fe-based electroplating layer was formed, and in these cases the peak(s) of emission intensity at wavelengths indicating Si (referred to as "Si intensity peak" for convenience in the table) and the number of crystalline grain boundaries in the Fe-based electroplating layer that were in contact with the Si-containing cold-rolled steel sheet at the interface between the Fe-based electroplating layer and the Si-containing cold-rolled steel sheet (referred to as "Number of grain boundaries in contact with steel substrate" for convenience in the table) were both not measurable, and are also indicated as "-". For those steel sheets with a decarburized layer having a thickness of less than 10 μm, the thickness of the decarburized layer is indicated as "-". When any variable on the left side of the formulas (1) and (2) was "-", the left side of the formulas (1) and (2) was calculated with the variable set to 0.

TABLE 6

| No. | Steel sample ID | Pre-annealing Fe-based electroplating layer Coating weight g/m² | Heating Average rate °C./sec | Annealing Dew point °C. | Fe-based electroplating layer $I_{Si, Fe}/I_{Si, bulk}$ | Number of grain boundaries in contact with steel substrate counts | C concentration in surface layer of Fe-based electroplating layer Thickness of decarburized layer μm |
|---|---|---|---|---|---|---|---|
| 1 | N | — | 10.5 | −29 | — | — | — |
| 2 | N | 3.7 | 12.0 | −15 | 0.64 | 10 | 44 |
| 3 | N | 5.2 | 12.0 | −10 | 0.66 | 13 | 55 |
| 4 | N | 15.3 | 20.0 | −10 | 0.57 | 14 | 71 |
| 5 | N | 18.6 | 10.5 | 6 | 0.59 | 21 | 89 |
| 6 | O | — | 12.0 | −13 | — | — | 34 |
| 7 | O | 3.0 | 15.0 | −14 | 0.67 | 11 | 42 |
| 8 | O | 5.3 | 2.0 | −25 | 0.65 | 5 | 37 |
| 9 | O | 6.1 | 12.0 | −15 | 0.60 | 14 | 59 |
| 10 | O | 15.7 | 12.0 | −4 | 0.61 | 20 | 73 |

| No. | C concentration in surface layer of Fe-based electroplating layer Concentration mass % | Resistance to cracking in resistance welding | Tensile strength TS MPa | Formula (1) Left side | Formula (2) Left side | Remarks |
|---|---|---|---|---|---|---|
| 1 | 0.09 | x | 841 | — | −29 | Comparative Example |
| 2 | 0.08 | x | 835 | 49.9 | −11 | Comparative example |
| 3 | 0.07 | ○ | 839 | 63.3 | −5 | Example |
| 4 | 0.04 | ⊚ | 832 | 95.5 | 5 | Example |
| 5 | 0.02 | ⊚ | 836 | 118.8 | 25 | Example |
| 6 | 0.11 | x | 1065 | 34.0 | −13 | Comparative example |
| 7 | 0.10 | x | 1066 | 46.8 | −11 | Comparative example |
| 8 | 0.10 | x | 1060 | 45.5 | −20 | Comparative example |
| 9 | 0.08 | ○ | 1068 | 68.8 | −9 | Example |
| 10 | 0.04 | ⊚ | 1064 | 98.1 | 12 | Example |

Underlined if outside the appropriate range of the present disclosure.

INDUSTRIAL APPLICABILITY

The galvanized steel sheet produced by the method disclosed herein not only has excellent resistance to cracking in resistance welding at a welded portion, in particular internal cracking, but also has high strength and excellent formability, making it suitable not only as the raw material used in automotive parts but also as the raw material for applications requiring similar properties in fields such as home appliances and construction materials.

REFERENCE SIGNS LIST

1 Galvanized steel sheet
2 Si-containing cold-rolled steel sheet
3 Fe-based electroplating layer
4 Galvanized layer
5 Test galvannealed steel sheet
6 Test specimen
7 Spacer
8 Fixing stand
9 Electrode
10 Nugget
11 Crack

The invention claimed is:

1. A galvanized steel sheet comprising:
a Si-containing cold-rolled steel sheet containing Si in an amount of 0.1 mass % or more and 3.0 mass % or less;
an Fe-based electroplating layer formed on at least one surface of the Si-containing cold-rolled steel sheet with a coating weight per surface of 5.0 g/m² or more;
a galvanized layer formed on the Fe-based electroplating layer; and
a decarburized layer extending from the interface between the galvanized layer and the Fe-based electroplating layer towards the Fe-based electroplating layer, wherein
in an intensity profile measured by glow discharge optical emission spectrometry, a value of $I_{Si,Fe}/I_{Si,bulk}$ is 0.50 or more, where $I_{Si,Fe}$ denotes an average Si intensity in a region ranging from an interface between the galvanized layer and the Fe-based electroplating layer to an interface between the Fe-based electroplating layer and the Si-containing cold-rolled steel sheet, and $I_{Si,bulk}$ denotes an average Si intensity in the Si-containing cold-rolled steel sheet,
an average value of C concentration in a region ranging from 10 μm to 20 μm in the thickness direction from the interface between the galvanized layer and the Fe-based electroplating layer towards the Fe-based electroplating layer is 0.10 mass % or less,
the number of crystal grain boundaries in the Fe-based electroplating layer that are in contact with the Si-containing cold-rolled steel sheet at the interface between the Fe-based electroplating layer and the Si-containing cold-rolled steel sheet is 10 or more per 10 μm in a sheet transverse direction in an observation field of view of the Si-containing cold-rolled steel sheet, and
a coating weight (g/m²) per surface of the Fe-based electroplating layer, denoted by $C.W._{Fe1}$, and a thickness (μm) of the decarburized layer, denoted by $C_d$, satisfy the following formula (1):

$$1.6 \times (C.W._{Fe1}) + (C_d) \geq 77 \quad (1).$$

2. The galvanized steel sheet according to claim 1, wherein the Si-containing cold-rolled steel sheet contains Si in an amount of 0.50 mass % or more and 3.0 mass % or less.

3. The galvanized steel sheet according to claim 1, wherein the decarburized layer has a thickness of 30 μm or more.

4. The galvanized steel sheet according to claim 1, wherein the Si-containing cold-rolled steel sheet has a chemical composition containing, in addition to Si, in mass %,
C: 0.8% or less,
Mn: 1.0% or more and 12.0% or less,
P: 0.1% or less,
S: 0.03% or less,
N: 0.010% or less, and
Al: 1.0% or less, with the balance being Fe and inevitable impurities.

5. The galvanized steel sheet according to claim 4, wherein the chemical composition further contains, in mass %, at least one element selected from the group consisting of
B: 0.005% or less,
Ti: 0.2% or less,
Cr: 1.0% or less,
Cu: 1.0% or less,
Ni: 1.0% or less,
Mo: 1.0% or less,
Nb: 0.20% or less,
V: 0.5% or less,
Sb: 0.020% or less,
Ta: 0.1% or less,
W: 0.5% or less,
Zr: 0.1% or less,
Sn: 0.20% or less,
Ca: 0.005% or less,
Mg: 0.005% or less, and
REM: 0.005% or less.

6. The galvanized steel sheet according to claim 1, wherein the Fe-based electroplating layer has a chemical composition containing at least one element selected from the group consisting of B, C, P, N, O, Ni, Mn, Mo, Zn, W, Pb, Sn, Cr, V, and Co, in a total amount of 10 mass % or less, with the balance being Fe and inevitable impurities.

7. An electrodeposition-coated steel sheet comprising:
a chemical conversion layer formed on the galvanized steel sheet as recited in claim 1; and
an electrodeposition coating layer formed on the chemical conversion layer.

8. An automotive part at least partially made from the electrodeposition-coated steel sheet as recited in claim 7.

9. A method of producing an electrodeposition-coated steel sheet, the method comprising:
subjecting the galvanized steel sheet as recited in claim 1 to chemical conversion treatment to obtain a chemical-conversion-treated steel sheet with a chemical conversion layer formed thereon; and
subjecting the chemical-conversion-treated steel sheet to electrodeposition coating treatment to obtain an electrodeposition-coated steel sheet with an electrodeposition coating layer formed on the chemical conversion layer.

10. A method of producing the galvanized steel sheet as recited in claim 1, the method comprising:
subjecting a cold-rolled steel sheet containing Si in an amount of 0.1 mass % or more and 3.0 mass % or less to Fe-based electroplating to obtain a pre-annealing Fe-based electroplated steel sheet with a pre-annealing Fe-based electroplating layer formed on at least one surface thereof with a coating weight per surface of 5.0 g/m² or more;

then heating the pre-annealing Fe-based electroplated steel sheet with an average heating rate of 10° C./sec or higher in a temperature range from 400° C. to 650° C., and cooling the pre-annealing Fe-based electroplated steel sheet after being held in the temperature range in an atmosphere with a dew point above −30° C., to obtain an Fe-based electroplated steel sheet; and then subjecting the Fe-based electroplated steel sheet to galvanization to obtain a galvanized steel sheet, wherein a coating weight (g/m²) per surface of the pre-annealing Fe-based electroplating layer, denoted by $C.W._{Fe0}$, and the dew point, denoted by D.P., satisfy the following formula (2):

$$(C.W._{Fe0}) + (D.P.) \geq 0 \tag{2}$$

11. The method of producing a galvanized steel sheet according to claim 10, wherein the cold-rolled steel sheet contains Si in an amount of 0.50 mass % or more and 3.0 mass % or less.

12. The method of producing a galvanized steel sheet according to claim 10, wherein the Fe-based electroplating is performed in an Fe-based electroplating bath containing at least one element selected from the group consisting of B, C, P, N, O, Ni, Mn, Mo, Zn, W, Pb, Sn, Cr, V, and Co, so that the at least one element is contained in the pre-annealing Fe-based electroplating layer in a total amount of 10 mass % or less.

\* \* \* \* \*